US011760855B2

United States Patent
Koyama et al.

(10) Patent No.: US 11,760,855 B2
(45) Date of Patent: Sep. 19, 2023

(54) ACRYLIC RESIN FILM, LAMINATED FILM, PRODUCTION METHOD FOR LAMINATED FILM, AND MOLDED ARTICLE

(71) Applicant: KANEKA CORPORATION, Osaka (JP)

(72) Inventors: Haruki Koyama, Osaka (JP); Hanako Hasebe, Osaka (JP); Katsumi Yamaguchi, Hyogo (JP); Yukihiro Shimamoto, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 17/023,904

(22) Filed: Sep. 17, 2020

(65) Prior Publication Data
US 2021/0002437 A1    Jan. 7, 2021

Related U.S. Application Data

(63) Continuation of application No. PCT/JP2019/010687, filed on Mar. 14, 2019.

(30) Foreign Application Priority Data

Mar. 22, 2018 (JP) ................................. 2018-055275

(51) Int. Cl.
| | |
|---|---|
| C08J 7/048 | (2020.01) |
| C08J 7/046 | (2020.01) |
| B32B 27/08 | (2006.01) |
| B32B 27/30 | (2006.01) |
| C08F 265/06 | (2006.01) |
| C08F 285/00 | (2006.01) |
| C08J 5/18 | (2006.01) |
| C08L 51/04 | (2006.01) |
| C08J 7/043 | (2020.01) |
| C08J 7/044 | (2020.01) |

(52) U.S. Cl.
CPC ............. *C08J 7/048* (2020.01); *B32B 27/08* (2013.01); *B32B 27/308* (2013.01); *C08F 265/06* (2013.01); *C08F 285/00* (2013.01); *C08J 5/18* (2013.01); *C08J 7/043* (2020.01); *C08J 7/044* (2020.01); *C08J 7/046* (2020.01); *C08L 51/04* (2013.01); *B32B 2255/10* (2013.01); *B32B 2255/26* (2013.01); *B32B 2264/025* (2013.01); *B32B 2305/72* (2013.01); *B32B 2307/418* (2013.01); *B32B 2307/536* (2013.01); *B32B 2457/20* (2013.01); *B32B 2605/003* (2013.01); *C08J 2351/04* (2013.01); *C08J 2483/04* (2013.01); *C08L 2207/53* (2013.01)

(58) Field of Classification Search
None
See application file for complete search history.

(56) References Cited

U.S. PATENT DOCUMENTS

| | | | | |
|---|---|---|---|---|
| 4,612,358 A | * | 9/1986 | Besecke | C08K 5/3475 526/259 |
| 5,318,737 A | * | 6/1994 | Trabert | C08L 51/06 264/177.17 |
| 5,804,287 A | | 9/1998 | Hatakeyama et al. | |
| 6,147,162 A | | 11/2000 | Tadokoro et al. | |
| 2003/0125465 A1 | | 7/2003 | Koyama et al. | |
| 2003/0236350 A1 | * | 12/2003 | Berzinis | C08F 265/04 525/71 |
| 2005/0112365 A1 | * | 5/2005 | Hayashida | G02B 1/105 428/336 |
| 2006/0069210 A1 | * | 3/2006 | Berzinis | C08F 265/04 525/242 |
| 2010/0093915 A1 | * | 4/2010 | Berzinis | C08L 33/12 524/523 |
| 2010/0183857 A1 | * | 7/2010 | Nouvelot | G02B 1/115 428/213 |
| 2011/0097561 A1 | * | 4/2011 | Kang | C08J 5/18 428/212 |

(Continued)

FOREIGN PATENT DOCUMENTS

| | | | |
|---|---|---|---|
| EP | 2325005 A2 | 5/2011 | |
| EP | 3115415 A1 | 1/2017 | |

(Continued)

OTHER PUBLICATIONS

Fujii—JP 2002-309059—IDS—MT—acrylic resin w-2 particles—2002 (Year: 2002).*

(Continued)

*Primary Examiner* — John Vincent Lawler

(74) *Attorney, Agent, or Firm* — Osha Bergman Watanabe & Burton LLP

(57) ABSTRACT

An acrylic resin film is provided that may include graft copolymer particles (A) with a multilayer structure and graft copolymer particles (B) with a multilayer structure, wherein the graft copolymer particles (A) may have an average particle size in the range of 20 to 150 nm, the graft copolymer particles (B) may have a larger average particle size than the graft copolymer particles (A). The graft copolymer particles (A) may include a cross-linked elastomer (A1) and a graft polymer layer (A2), the graft polymer layer (A2) being closer to a surface layer than the cross-linked elastomer (A1). Further, a constituent unit may be derived from an acrylate with an alkyl ester moiety having two or more carbon atoms constitutes 8% or less by mass of the graft polymer layer (A2), the graft copolymer particles (B) may contain a cross-linked elastomer (B1).

22 Claims, No Drawings

(56) References Cited

U.S. PATENT DOCUMENTS

| | | | | |
|---|---|---|---|---|
| 2014/0308501 A1* | 10/2014 | Nishimura | ............ | C08F 265/06 |
| | | | | 428/220 |
| 2015/0247013 A1 | 9/2015 | Koyama et al. | | |
| 2016/0053104 A1* | 2/2016 | Kitayama | ................ | C08J 5/18 |
| | | | | 525/79 |
| 2017/0031058 A1* | 2/2017 | Kitayama | ............ | C08L 101/00 |
| 2018/0067234 A1* | 3/2018 | Fujimoto | ................ | G02B 1/111 |

FOREIGN PATENT DOCUMENTS

| | | | | | |
|---|---|---|---|---|---|
| JP | H08-323934 | A | | 12/1996 | |
| JP | H10-279766 | A | | 10/1998 | |
| JP | H10-306192 | A | | 11/1998 | |
| JP | 2002/309059 | | * | 10/2002 | ............ B32B 27/30 |
| JP | 2002-309059 | A | | 10/2002 | |
| JP | 2005/163003 | | * | 6/2005 | ............ B29C 45/14 |
| JP | 2005/200502 | | * | 7/2005 | ............ C08F 265/06 |
| JP | 2005-200502 | A | | 7/2005 | |
| JP | 3835275 | B2 | | 10/2006 | |
| JP | 4291994 | B2 | | 7/2009 | |
| JP | 2015/096575 | | * | 5/2015 | ............ C08L 33/10 |
| JP | 2015-096575 | A | | 5/2015 | |
| JP | 5782521 | B2 | | 9/2015 | |
| KR | 2005/0079296 | | * | 8/2005 | ............ C08F 20/06 |
| WO | 2014/041803 | A1 | | 3/2014 | |

OTHER PUBLICATIONS

Nagasaka—JP 2005-200502 A—IDS—MT—impact resistant w-2-layer and 3-layer particles—2005 (Year: 2005).*

Fukamachi—JP 2015-096575 A—ISR D1—MT—thermoplastic resin—2015 (Year: 2015).*

Kitaike—JP 2005-163003 A—MT—multilayer acrylate resin w-particles—2005 (Year: 2005).*

Ko—KR 2005-0079296 A—Allow.Rel.Case—MT—acyrlic resin w-particles—2005 (Year: 2005).*

International Search Report issued in International Application No. PCT/JP2019/010687, dated Jun. 4, 2019 (2 pages).

Written Opinion issued in International Application No. PCT/JP2019/010687, dated Jun. 4, 2019 (4 pages).

* cited by examiner

ACRYLIC RESIN FILM, LAMINATED FILM, PRODUCTION METHOD FOR LAMINATED FILM, AND MOLDED ARTICLE

TECHNICAL FIELD

One or more embodiments of the present disclosure relates to an acrylic resin film, a laminated film including the acrylic resin film, a molded article including the acrylic resin film and/or the laminated film.

BACKGROUND

Making the most of their good characteristics, such as high transparency, hardness, weatherability, and secondary formability, acrylic resin films formed by processing acrylic resin compositions containing elastomers have been used and developed in various applications. Examples of the applications of acrylic resin films include decorative and protective applications in automotive interior and exterior components laminated with a film substituted for coating, decoration and protection of exteriors of products, such as portable electronic devices, personal computers, and household electrical appliances, and building material applications. A method for forming an acrylic resin film to be used in applications, such as the decoration and protection of the surface of such formed products with a three-dimensional shape, may be secondary forming, such as air-pressure forming, vacuum forming, hot press forming, insert/in-mold forming, or three-dimensional laminate forming.

Various propositions have been made for acrylic resin films suitable for such applications. For example, the following methods are known: a method for specifying the reduced viscosity of a thermoplastic polymer constituting an acrylic resin film or the particle size and rubber content of a rubber-containing polymer (Patent Literature 1), a method for specifying the reduced viscosity of an acrylic polymer or the amount of acrylic polymer with a multilayer structure (Patent Literature 2 and Patent Literature 3), and a method for using rubber particles with different particle sizes to reduce the cloudiness of a film in high-temperature processing (Patent Literature 4). Such films have high transparency and formability.

Acrylic resin films described in Patent Literature 1 to Patent Literature 4, however, have been developed without considering film whitening on bending. Thus, acrylic resin films described in Patent Literature 1 to Patent Literature 4 applied to molded articles with a complex shape are likely to cause whitening due to stress concentration on corners. Film whitening significantly lowers the commercial value of molded articles including the acrylic resin films. Furthermore, a considerable increase in formability or fracture resistance of these acrylic resin films may result in lower surface hardness of the films due to their high rubber-like elastomer contents.

A film with high surface hardness and resistance to whitening on bending (hereinafter referred to as flex whitening resistance) proposed in Patent Literature 5 is an acrylic resin film formed from a methacrylic resin composition (D) containing a methacrylate resin (A), a rubber-containing graft copolymer (B), and a rubber-containing graft copolymer (C). The whitening of the acrylic resin film described in Patent Literature 5 in secondary forming is reduced by optimizing the amount of rubber particles in the rubber-containing graft copolymer (B) and the rubber-containing graft copolymer particles (C) or by optimizing the layer structure or the composition of each layer of the rubber-containing graft copolymer (B) and rubber-containing graft copolymer particles (C).

Patent Document 1: Japanese Unexamined Patent Application, Publication No. H08-323934
Patent Document 2: Japanese Unexamined Patent Application, Publication No. H10-279766
Patent Document 3: Japanese Unexamined Patent Application, Publication No. H10-306192
Patent Document 4: Japanese Patent No. 3835275
Patent Document 5: Japanese Patent No. 5782521

In the above applications of acrylic resin films, such as decoration and protection of the surface of formed products, however, the acrylic resin films are often covered with a functional layer, such as a hard coat layer, to provide molded articles with surface hardness, scratch resistance, chemical resistance, stain resistance, antiglare properties, antireflection characteristics, antistatic properties, abrasion resistance, or ease of surface design. Such a functional layer is often formed by applying a coating liquid containing an organic solvent for forming the functional layer to a surface of an acrylic resin film.

When the acrylic resin film described in Patent Literature 5 is brought into contact with a coating liquid containing an organic solvent, however, folding the laminated film including a functional layer, such as a hard coat layer, tends to cause cracking in the bent portion, or cutting the film with a cutting tool, such as a cutter, tends to cause cracking near the cut portion.

SUMMARY

One or more embodiments of the present disclosure provides a hard acrylic resin film that is less likely to cause cracking in a bent portion of a laminated film including a functional layer, such as a hard coat layer, when the laminated film is bent, and cracking near a cut portion when the film is cut with a cutting tool, even after brought into contact with a coating liquid containing an organic solvent, and that is less likely to cause whitening due to the concentration of stress; a laminated film including the acrylic resin film; and a molded article including the acrylic resin film and/or the laminated film.

The present inventors have embodied the present disclosure by finding one or more embodiments of an acrylic resin film containing graft copolymer particles (A) with an average particle size in the range of 20 to 150 nm and with a multilayer structure and graft copolymer particles (B) with a multilayer structure and with a larger average particle size than the graft copolymer particles (A) by optimizing the constituent unit ratio of a graft polymer layer (A2) in the graft copolymer particles (A) and by optimizing the amounts of cross-linked elastomers derived from the graft copolymer particles (A) and the graft copolymer particles (B). More specifically, one or more embodiments of the present disclosure provides the following (1) to (17).

(1) An acrylic resin film containing graft copolymer particles (A) with a multilayer structure and graft copolymer particles (B) with a multilayer structure, wherein
the graft copolymer particles (A) have an average particle size in the range of 20 to 150 nm,
the graft copolymer particles (B) have a larger average particle size than the graft copolymer particles (A),
the graft copolymer particles (A) include a cross-linked elastomer (A1) and a graft polymer layer (A2), the graft polymer layer (A2) being closer to a surface layer than the cross-linked elastomer (A1), a constituent unit derived from an acrylate with an alkyl ester moiety having two or more carbon atoms constitutes 8% or less by mass of the graft polymer layer (A2), the graft copolymer particles (B) contain a cross-linked elastomer (B1), and the following conditions 1) and 2) are satisfied:

1) the total amount of the cross-linked elastomer (A1) and the cross-linked elastomer (B1) in the acrylic resin film is 15 parts or less by mass per 100 parts by mass of the acrylic resin film, and 2) the amount of the cross-linked elastomer (B1) is 7 parts or less by mass per 100 parts by mass of the acrylic resin film.

(2) The acrylic resin film according to (1), wherein the amount of the cross-linked elastomer (B1) is 4 parts or less by mass per 100 parts by mass of the acrylic resin film.

(3) The acrylic resin film according to (1) or (2), wherein the graft copolymer particles (B) have an average particle size in the range of 150 to 400 nm.

(4) The acrylic resin film according to any one of (1) to (3), wherein the graft copolymer particles (A) constitute 1% to 40% by mass of the acrylic resin film, and the graft copolymer particles (B) constitute 5% or less by mass of the acrylic resin film.

(5) The acrylic resin film according to any one of (1) to (4), wherein the graft polymer layer (A2) contains a constituent unit derived from a reactive ultraviolet absorber.

(6) The acrylic resin film according to any one of (1) to (5), wherein the acrylic resin film is used as a target to which a liquid containing an organic solvent is to be applied.

(7) The acrylic resin film according to (6), wherein the liquid is a coating liquid for forming a hard coat layer.

(8) A laminated film including the acrylic resin film according to any one of (1) to (7) and at least one functional layer.

(9) The laminated film according to (8), wherein the functional layer is in direct contact with at least one surface of the acrylic resin film.

(10) The laminated film according to (8) or (9), including at least one hard coat layer as the functional layer.

(11) The laminated film according to (10), including a low-refractive-index layer on the hard coat layer.

(12) The laminated film according to (11), including a high-refractive-index layer between the hard coat layer and the low-refractive-index layer.

(13) The laminated film according to any one of (8) to (12), wherein at least one layer of the at least one functional layer is formed of a cured product of a composition containing a siloxane resin with a group including an epoxy group.

(14) A method for producing a laminated film including applying a coating liquid containing an organic solvent for forming a functional layer to at least one surface of the acrylic resin film according to any one of (1) to (7) to form a coating film; and drying or drying and curing the coating film to form the functional layer.

(15) A molded article including the acrylic resin film according to any one of claims (1) to (7) and/or the laminated film according to any one of (8) to (13).

(16) The molded article according to (15), wherein at least part of the surface of a member formed of a thermoplastic resin is covered with the acrylic resin film and/or the laminated film.

(17) An in-vehicle display front panel including the molded article according to (15) or (16).

DETAILED DESCRIPTION

One or more embodiments of the present disclosure can provide a hard acrylic resin film that is less likely to cause cracking in a bent portion of a laminated film including a functional layer, such as a hard coat layer, when the laminated film is bent, and cracking near a cut portion when the film is cut with a cutting tool, even after brought into contact with a coating liquid containing an organic solvent, and that is less likely to cause whitening due to the concentration of stress; a laminated film including the acrylic resin film; and a molded article including the acrylic resin film and/or the laminated film.

<<Acrylic Resin Film>>

An acrylic resin film includes graft copolymer particles (A) with a multilayer structure and graft copolymer particles (B) with a multilayer structure. More specifically, the acrylic resin film includes the graft copolymer particles (A) with a multilayer structure and the graft copolymer particles (B) with a multilayer structure dispersed in an acrylic resin or in a matrix of an acrylic resin composition.

The acrylic resin film that contains the graft copolymer particles (A) and the graft copolymer particles (B) such that the specified conditions described in detail below are satisfied is less likely to cause cracking in a bent portion of a laminated film including a functional layer, such as a hard coat layer, when the laminated film is bent, and cracking near a cut portion when the film is cut with a cutting tool, even after brought into contact with a coating liquid containing an organic solvent, is less likely to cause whitening in the bent or cut portion of the film, and has high hardness.

Furthermore, the acrylic resin film can be used as a base film to easily produce a laminated film with high transparency, weatherability, surface hardness, secondary formability, and adhesiveness to decorative substrates formed of various thermoplastic and thermosetting resins. Examples of the thermoplastic resins used as materials of the decorative substrates include polycarbonate resins with a bisphenol skeleton, a fluorene skeleton, or an isosorbide skeleton, acrylic resins, styrene resins (AS resins, ABS resins, MAS resins, etc.), saturated polyester resins, poly(vinyl chloride) resins, polyarylate resins, PPS resins, POM resins, polyamide resins, poly(lactic acid) resins, cellulose acylate resins, and polyolefin resins. Examples of the thermosetting resins include epoxy resins, vinyl ester resins, unsaturated polyester resins, phenolic resins, melamine resins, and benzoxazine resins.

The acrylic resin film in one or more embodiments may have a haze value of 1.3% or less, 1.1% or less, 0.8% or less, and 0.6% or less, according to JIS K6174.

The acrylic resin film in one or more embodiments may have an elongation at break of 40% or more, 50% or more, 60% or more, 63% or more, and 65% or more. The elongation at break is measured with a Tensilon tensile tester at a grip distance of 40 mm and at a crosshead speed of 200 mm/min. The elongation at break is the average of the measurements of five or more test specimens, and in one or more embodiments five test specimens, from which the highest value and the lowest value are removed.

The acrylic resin film in one or more embodiments may have a pencil hardness of B or higher, and/or HB or higher, according to JIS K5600-5-4.

One or more embodiments of the acrylic resin film may maintain transparency even when having whitening at the bent portion and further may maintain transparency without causing whitening at the bent portion in a 180-degree bending test at a bending rate of 90 degrees/second. The bending test is performed at a temperature of 23° C.±2° C. and at a humidity of 50%±5%.

The essential and optional components of the acrylic resin film and a method for producing the acrylic resin film are described below.

<Acrylic Resin>

In one or more embodiments, the acrylic resin for use in the acrylic resin film may be a known acrylic resin. For example, 100 parts by mass of the acrylic resin may contain 20 to 100 parts by mass of a thermoplastic acrylic polymer composed of 50% to 100% by mass of a methyl methacrylate unit and 0% to 50% by mass of another constituent unit in terms of hardness and formability.

To improve the heat resistance, rigidity, and surface hardness of the acrylic resin, a constituent unit with a particular structure may be introduced into the acrylic resin by copolymerization, by functional group modification, or by modification. Examples of the particular structure include a glutarimide structure as described in Japanese Unexamined Patent Application Publication No. 62-89705, Japanese Unexamined Patent Application Publication No. 02-178310, and WO 2005/54311, a lactone ring structure as described in Japanese Unexamined Patent Application Publication No. 2004-168882 and Japanese Unexamined Patent Application Publication No. 2006-171464, a glutaric anhydride structure formed by thermal condensation and cyclization of a (meth) acrylic acid unit as described in Japanese Unexamined Patent Application Publication No. 2004-307834, a maleic anhydride structure as described in Japanese Unexamined Patent Application Publication No. 5-119217, and an N-substituted maleimide structure or an unsubstituted maleimide structure as described in WO 2009/84541. For example, these structures introduced into the acrylic resin make the molecular chain rigid. This potentially improves heat resistance or surface hardness, decreases thermal shrinkage, or improves chemical resistance.

Examples of the other constituent unit include constituent units derived from acrylic acid, acrylic acid derivatives, methacrylic acid, methacrylic acid derivatives, aromatic vinyl derivatives, vinyl cyanide derivatives, and halogenated vinylidenes. The acrylic resin, the main component of the acrylic resin film, may contain the other constituent units alone or in combination.

Examples of the acrylic acid derivatives in the other constituent unit include acrylates, such as methyl acrylate, n-butyl acrylate, ethyl acrylate, n-propyl acrylate, isobutyl acrylate, t-butyl acrylate, cyclohexyl acrylate, 2-hydroxyethyl acrylate, 2-phenoxyethyl acrylate, benzyl acrylate, 2-(N,N-dimethylamino)ethyl acrylate, and glycidyl acrylate, and vinyl cyanides, such as acrylonitrile.

Examples of the methacrylic acid derivatives in the other constituent unit include methacrylates, such as ethyl methacrylate, n-propyl methacrylate, n-butyl methacrylate, isobutyl methacrylate, t-butyl methacrylate, phenyl methacrylate, benzyl methacrylate, cyclohexyl methacrylate, 2-phenoxyethyl methacrylate, isobornyl methacrylate, dicyclopentenyl methacrylate, glycidyl methacrylate, and adamantyl methacrylate, and vinyl cyanides, such as methacrylonitrile.

Examples of the aromatic vinyl derivatives in the other constituent unit include styrene, vinyltoluene, and α-methylstyrene.

Examples of the vinyl cyanide derivatives in the other constituent unit include acrylonitrile and methacrylonitrile.

Examples of the halogenated vinylidenes in the other constituent unit include vinylidene chloride and vinylidene fluoride.

The acrylic resin may be produced by any method. A method for producing the acrylic resin may be a known suspension polymerization method, bulk polymerization method, solution polymerization method, emulsion polymerization method, or dispersion polymerization method. A known radical polymerization method, living radical polymerization method, anionic polymerization method, or cationic polymerization method may also be used.

In combination with a thermoplastic resin having at least partial miscibility with the acrylic resin, the acrylic resin may be used in an acrylic resin composition without compromising one or more embodiments of the present disclosure. Examples of the thermoplastic resin that can be used in combination with the acrylic resin include styrene resins, poly(vinyl chloride) resins, polycarbonate resins, amorphous saturated polyester resins, polyamide resins, phenoxy resins, polyarylate resins, olefin-(meth)acrylic acid derivative resins, cellulose derivatives (cellulose acylate, etc.), poly(vinyl acetate) resins, poly(vinyl alcohol) resins, poly (vinyl acetal) resins, poly(lactic acid) resins, and PHBH resins. Examples of the styrene resins include styrene-acrylonitrile resins, styrene-(meth)acrylic acid resins, styrene-maleic anhydride resins, styrene-N-substituted maleimide resins, styrene-unsubstituted maleimide resins, styrene-acrylonitrile-butadiene resins, and styrene-acrylonitrile-acrylate resins. Among these thermoplastic resins, styrene resins and polycarbonate resins may be utilized in one or more embodiments because these resins have high miscibility with the acrylic resin and can improve the flex cracking resistance, solvent resistance, and low hygroscopicity of the acrylic resin film.

<Graft Copolymer Particles (A) and Graft Copolymer Particles (B)>

As described above, the acrylic resin film contains the graft copolymer particles (A) with a multilayer structure and the graft copolymer particles (B) with a multilayer structure. The graft copolymer particles (A) have an average particle size in the range of 20 to 150 nm. The graft copolymer particles (B) have a larger average particle size than the graft copolymer particles (A).

The graft copolymer particles (A) include a cross-linked elastomer (A1) and a graft polymer layer (A2), the graft polymer layer (A2) being closer to a surface layer than the cross-linked elastomer (A1). A constituent unit derived from an acrylate with an alkyl ester moiety having two or more carbon atoms constitutes 8% or less by mass of the graft polymer layer (A2). The graft copolymer particles (A) have high solvent resistance due to the graft polymer layer (A2) satisfying the above conditions.

Like the graft copolymer particles (A), the graft copolymer particles (B) include a cross-linked elastomer (B1). Like the graft copolymer particles (A), the graft copolymer particles (B) typically include a graft polymer layer (B2) located closer to the surface layer than the cross-linked elastomer (B1). Due to the presence of the cross-linked elastomer (B1) and their larger particle size than the graft copolymer particles (A), the graft copolymer particles (B) impart toughness to the acrylic resin film. The use of an excessively high amount of the graft copolymer particles (B), however, may increase whitening on bending in the acrylic resin. This may also decrease pencil hardness.

The acrylic resin film contains the graft copolymer particles (A) and the graft copolymer particles (B) such that the following conditions 1) and 2) are satisfied:

1) the total amount of the cross-linked elastomer (A1) and the cross-linked elastomer (B1) in the acrylic resin film is 15 parts or less by mass per 100 parts by mass of the acrylic resin film, and 2) the amount of the cross-linked elastomer (B1) is 7 parts or less by mass per 100 parts by mass of the acrylic resin film.

It should be noted that the cross-linked elastomer (A1) and the cross-linked elastomer (B1) in the graft copolymer particles (A) or the graft copolymer particles (B) may contain a concentric spherical hard or semi-hard core particle within each particle, as described later. For the cross-linked elastomer (A1) and the cross-linked elastomer (B1) containing the core particle, the amount (mass) of the cross-linked elastomer includes the mass of the core particle.

The acrylic resin film that contains the graft copolymer particles (A) and the graft copolymer particles (B) such that the conditions 1) and 2) are satisfied is less likely to cause cracking in a bent portion of a laminated film including a functional layer, such as a hard coat layer, when the laminated film is bent, and cracking near a cut portion when the film is cut with a cutting tool, even after brought into contact with a coating liquid containing an organic solvent, is less likely to cause whitening in the bent or cut portion of the film, and has high hardness.

In one or more embodiments, the amount of the cross-linked elastomer (B1) may be 4 parts or less by mass per 100 parts by mass of the acrylic resin film. In these one or more embodiments, even after the acrylic resin film is brought into contact with an organic solvent, or even when a coating liquid containing an organic solvent is used to form a hard coat layer on the acrylic resin film, the acrylic resin film or laminated film may have a low haze value.

The cross-linked elastomer (A1) in the graft copolymer particles (A) may be a known cross-linked elastomer. In one or more embodiments, the cross-linked elastomer (A1) may be an acrylate cross-linked elastomer. The acrylate cross-linked elastomer is a cross-linked elastomer formed of a polymer containing an acrylate as a main component.

The particles of the cross-linked elastomer (A1) based on an acrylate may have a concentric spherical multilayer structure including a hard or semi-hard polymer core particle in a cross-linked elastomer layer. Examples of the core particle include hard cross-linked methacrylate resin particles as described in Japanese Examined Patent Application Publication No. 55-27576, methyl methacrylate-acrylate-styrene semi-hard cross-linked particles as described in Japanese Unexamined Patent Application Publication No. 4-270751, and cross-linked rubber particles with a high degree of cross-linking. Such a core particle in the particles of the cross-linked elastomer (A1) based on an acrylate potentially improves transparency and color tone.

In one or more embodiments, the graft copolymer particles (A) may have a core-shell structure produced by forming the graft polymer layer (A2) by graft polymerization in the presence of the particles of the cross-linked elastomer (A1) based on an acrylate.

In one or more embodiments, the graft copolymer particles (A) may have an average particle size in the range of 20 to 150 nm, and further 50 to 100 nm. The graft copolymer particles (A) have a smaller average particle size than the graft copolymer particles (B). Thus, the graft copolymer particles (A) have a larger specific surface area per unit mass. Graft copolymers with a small particle size usually tend to result in the embrittlement of acrylic resin films due to impregnation with solvent. The graft copolymer particles (A), however, have a graft moiety with high solvent resistance due to the graft polymer layer (A2) satisfying the specified conditions. Furthermore, the concurrent use of a small amount of the graft copolymer particles (B) with a larger particle size can decrease the total amount of cross-linked elastomer components used to impart necessary fracture resistance to acrylic resin films and laminated films than before. These reduce the occurrence of cracking in films after the coating process of bringing the films into contact with a coating liquid containing an organic solvent and reduce the occurrence of whitening.

For the graft copolymer particles (A) with an excessively small average particle size, the acrylic resin film tends to have lower impact resistance and flex cracking resistance. For the graft copolymer particles (A) with an excessively large average particle size, the acrylic resin film tends to have lower transparency or is more likely to cause whitening on bending.

In one or more embodiments, the cross-linked elastomer (A1) for use in the graft copolymer particles (A) may be cross-linked elastomer particles formed by polymerization of a monomer mixture (a-1) composed of an acrylate, another vinyl monomer copolymerizable with the acrylate, and a polyfunctional monomer copolymerizable with the acrylate and having two or more unconjugated double bonds per molecule.

All the monomers and polyfunctional monomer may be mixed and polymerized in a single step. To adjust the toughness and whitening resistance of the film, different compositions or the same composition of the monomers and polyfunctional monomer may be polymerized in two or more steps.

In one or more embodiments, the acrylate for use in the cross-linked elastomer (A1) may be an aliphatic acrylate, an alkyl acrylate, and further an alkyl acrylate having 1 to 22 carbon atoms, in terms of polymerization reactivity, low cost, and the formation of a polymer with a low Tg.

In one or more embodiments, specific examples of monomers may include methyl acrylate, ethyl acrylate, propyl acrylate, butyl acrylate, isobutyl acrylate, 2-ethylhexyl acrylate, n-octyl acrylate, isobornyl acrylate, cyclohexyl acrylate, dodecyl acrylate, stearyl acrylate, heptadecyl acrylate, and octadecyl acrylate. These may be used alone or in combination.

In one or more embodiments, the acrylate may constitute 50% or more by mass, 70% or more by mass, and further 80% or more by mass, of the monomer mixture (a-1). An acrylate content of 50% or more by mass results in an acrylic resin film with high impact resistance and elongation at break and with less cracking in secondary forming.

Examples of the other vinyl monomer copolymerizable with the acrylate include methacrylates, such as methyl methacrylate, ethyl methacrylate, propyl methacrylate, n-butyl methacrylate, isobutyl methacrylate, t-butyl methacrylate, phenyl methacrylate, benzyl methacrylate, cyclohexyl methacrylate, phenoxyethyl methacrylate, isobornyl methacrylate, and dicyclopentenyl methacrylate; vinyl halides, such as vinyl chloride and vinyl bromide; vinyl cyanides, such as acrylonitrile and methacrylonitrile; vinyl esters, such as vinyl formate, vinyl acetate, and vinyl propionate; aromatic vinyl derivatives, such as styrene, vinyltoluene, and α-methylstyrene; halogenated vinylidenes, such as vinylidene chloride and vinylidene fluoride; acrylic acid and salts thereof, such as acrylic acid, sodium acrylate, and calcium acrylate; acrylic acid derivatives, such as β-hydroxyethyl acrylate, phenoxyethyl acrylate, benzyl acrylate, dimethylaminoethyl acrylate, glycidyl acrylate, acrylamide, and N-methylolacrylamide; methacrylic acid and salts thereof, such as methacrylic acid, sodium methacrylate, and calcium methacrylate; methacrylic acid derivatives, such as methacrylamide, β-hydroxyethyl methacrylate, dimethylaminoethyl methacrylate, and glycidyl methacrylate; and maleic acid derivatives, such as maleic anhydride, N-alkylmaleimide, and N-phenylmaleimide. These may be used alone or in combination. Among these, methacrylates and aromatic vinyl derivatives are may be utilized in terms of weatherability and transparency in one or more embodiments.

In one or more embodiments, the other vinyl monomer copolymerizable with the acrylate in the cross-linked elastomer (A1) may constitute 0% to 49.9% by mass, 0% to 30% by mass, and further 0% to 20% by mass, of the monomer mixture (a-1). An amount of the other vinyl monomer above 49.9% by mass may result in an acrylic resin film with low impact resistance, low elongation at break, and more cracking in secondary forming.

The polyfunctional monomer in the cross-linked elastomer (A1) may be a monomer usually used as a cross-linker and/or a grafting agent. Examples of the polyfunctional monomer include allyl methacrylate, allyl acrylate, triallyl cyanurate, triallyl isocyanurate, diallyl phthalate, diallyl maleate, divinyl adipate, divinyl benzene, ethylene glycol dimethacrylate, propylene glycol dimethacrylate, diethylene glycol dimethacrylate, triethylene glycol dimethacrylate, trimethylolpropane trimethacrylate, poly(ethylene glycol) dimethacrylate, and dipropylene glycol dimethacrylate. These polyfunctional monomers may be used alone or in combination.

In one or more embodiments, the polyfunctional monomer may constitute 0.1% to 10% by mass, and further 1.0% to 4% by mass, of the monomer mixture (a-1) in the cross-linked elastomer (A1). In one or more embodiments, the amount of the polyfunctional monomer in these ranges may be utilized in terms of the flex cracking resistance and flex whitening resistance of the acrylic resin film and in terms of resin fluidity during forming.

To increase the graft coverage efficiency of the graft polymer layer (A2) in the cross-linked elastomer (A1) described later, the amount of the polyfunctional monomer in the cross-linked elastomer (A1) may be different between the interior and the near surface region. More specifically, as described in Japanese Patent No. 1460364 and No 1786959, a larger amount of the polyfunctional monomer having the function of a grafting agent in the near surface region of the cross-linked elastomer (A1) than in the interior can improve the coverage of the graft copolymer particles (A) with a graft polymer, improve the dispersibility of the graft copolymer particles (A) in the acrylic resin, and reduce the decrease in fracture resistance due to interfacial separation between the graft copolymer particles (A) and the acrylic resin. The sufficient coverage with a relatively small amount of the graft polymer (A2) can reduce the amount of the graft copolymer particles (A) used to introduce a predetermined amount of cross-linked elastomer into the acrylic resin composition, potentially improve the melt processability of the acrylic resin film due to decreased melt viscosity, improve film processing accuracy, and improve surface hardness.

A chain transfer agent may be added to the monomer mixture (a-1) to control the molecular weight and cross-linking density of the cross-linked elastomer (A1) and to control thermal stability related to the number of double bond ends of the polymer. The chain transfer agent is selected from chain transfer agents typically used for radical polymerization. For example, the chain transfer agent is may be one or more embodiments of a monofunctional or polyfunctional mercaptan compound having 2 to 20 carbon atoms, such as n-octyl mercaptan, n-dodecyl mercaptan, or t-dodecyl mercaptan, a mercapto acid, thiophenol, carbon tetrachloride, or a mixture thereof. The amount of chain transfer agent to be used ranges from 0 to 0.1 parts by mass, and further from 0 to 0.2 parts by mass, per 100 parts by mass of the monomer mixture (a-1).

The particles of the cross-linked elastomer (A1) include a single layer or two or more layers of the cross-linked elastomer or include the cross-linked elastomer layer in at least one layer of a multilayer particle including a hard or semi-hard cross-linked resin layer.

Examples of the monomer(s) constituting the hard or semi-hard cross-linked resin layer include methacrylates, such as methyl methacrylate, ethyl methacrylate, butyl methacrylate, benzyl methacrylate, and phenoxyethyl methacrylate; alkyl acrylates, such as methyl acrylate, ethyl acrylate, propyl acrylate, n-butyl acrylate, isobutyl acrylate, t-butyl acrylate, 2-ethylhexyl acrylate, and n-octyl acrylate; aromatic vinyls, such as styrene and α-methylstyrene; vinyl cyanides, such as acrylonitrile; maleic acid derivatives, such as maleic anhydride and maleimide; and polyfunctional monomers having two or more unconjugated double bonds per molecule.

Among these, methyl methacrylate, butyl methacrylate, butyl acrylate, ethyl acrylate, styrene, and acrylonitrile may be utilized in one or more embodiments. The polyfunctional monomers may be the monomers that are used to form the cross-linked elastomer layer by polymerization. In the formation of the hard or semi-hard cross-linked resin layer by polymerization, a chain transfer agent may be used in combination with these monomers to control the cross-linking density or to reduce the number of double bond ends of the polymer to control thermal stability. The chain transfer agent may be the chain transfer agent that is used to form the cross-linked elastomer layer by polymerization. The amount of chain transfer agent to be used ranges from 0 to 2 parts by mass, and further from 0 to 0.5 parts by mass, per 100 parts by mass of the hard or semi-hard cross-linked resin layer.

For graft copolymer particles with a two-layer structure composed of the cross-linked elastomer particles (A1), which are core particles, and the graft polymer layer (A2), the graft copolymer particles (A) are typically produced by forming the graft polymer layer (A2) in the presence of the cross-linked elastomer particles (A1) by graft copolymerization of a monomer mixture (a-2) composed of 50% to 100% by mass methacrylate and 0% to 50% by mass another vinyl monomer copolymerizable with the methacrylate.

In one or more embodiments, the composition of the monomer mixture (a-2) is adjusted such that the constituent unit derived from an acrylate with an alkyl ester moiety having two or more carbon atoms that may constitute 8% or less by mass, 4% or less by mass, and further 3% or less by mass, of the graft polymer layer (A2). For example, in one or more embodiments the constituent unit derived from an acrylate with an alkyl ester moiety having two or more carbon atoms may constitute 0.1% or more by mass, 0.5% or more by mass, and further 1% or more by mass, of the mass of the graft polymer layer (A2). If the constituent unit derived from an acrylate with an alkyl ester moiety having two or more carbon atoms constitutes such a percentage range, even when a functional layer is formed on the acrylic resin film using a coating liquid containing an organic solvent, the laminated film can be cut with a cutting tool, such as a cutter, without causing significant cracking in the cut portion.

In one or more embodiments, the acrylate with an alkyl ester moiety having two or more carbon atoms may be ethyl acrylate, propyl acrylate, butyl acrylate, hexyl acrylate, cyclohexyl acrylate, octyl acrylate, dodecyl acrylate, or stearyl acrylate. In one or more further embodiments, the acrylate with an alkyl ester moiety having two or more carbon atoms may be ethyl acrylate or butyl acrylate, and further butyl acrylate (n-butyl acrylate).

In one or more embodiments, the graft copolymer particles with the two-layer structure composed of the cross-linked elastomer particles (A1), which are core particles, and the graft polymer layer (A2) may be formed by graft copolymerization of 95 to 10 parts by mass of the monomer mixture (a-2) composed of 80% to 99% by mass alkyl methacrylate, 8% or less by mass acrylate with an alkyl ester moiety having two or more carbon atoms, and 0% to 19% by mass another vinyl monomer in the presence of 5 to 90 parts by mass of the cross-linked elastomer particles (A1) in at least one step. The total amount of the cross-linked elastomer particles (A1) and the monomer mixture (a-2) is 100 parts by mass.

In one or more embodiments, the alkyl methacrylate content of the monomer mixture (a-2) may be 50% or more by mass, 70% or more by mass, and further 90% or more by mass, to ensure miscibility with the acrylic resin matrix, to reduce the decrease in toughness of a coating film due to impregnation with solvent during the coating of the acrylic resin film, and to reduce whitening and cracking due to stretching in forming.

The other vinyl monomer usable in the monomer mixture (a-2) may be an aromatic vinyl compound, such as styrene or a nuclear substitution product thereof, an unsaturated nitrile, such as acrylonitrile, (meth)acrylic acid or a derivative thereof, an N-substituted maleimide, maleic anhydride, or (meth)acrylamide.

In one or more embodiments, the monomer mixture (a-2) may also contain a reactive ultraviolet absorber as another vinyl monomer. In other words, in one or more embodiments the graft polymer layer (A2) may also contain a constituent unit derived from the reactive ultraviolet absorber. When the monomer (a-2) contains the reactive ultraviolet absorber, the acrylic resin film can have high weatherability and chemical resistance.

The reactive ultraviolet absorber may be, but is not limited to, a known reactive ultraviolet absorber. In one or more embodiments, the reactive ultraviolet absorber may be a compound represented by the following general formula (1) in terms of the forming processability and weatherability of the acrylic resin film.

General Formula (1)

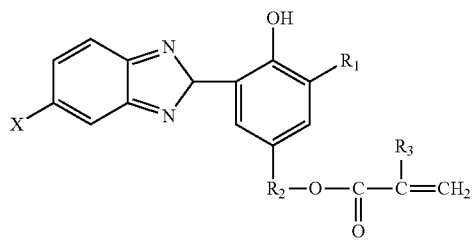

(In the formula (1), X denotes a hydrogen atom or a halogen atom, $R^1$ denotes a hydrogen atom, a methyl group, or a t-alkyl group having 4 to 6 carbon atoms, $R^2$ denotes a linear or branched alkylene group having 2 to 10 carbon atoms, and $R^3$ denotes a hydrogen atom or a methyl group.)

More specifically, the reactive ultraviolet absorber represented by the general formula (1) may be a 2-(2'-hydroxy-5'-methacryloyloxyethylphenyl)-2H-benzotriazole, such as 2-(2'-hydroxy-5'-acryloyloxyethylphenyl)-2H-benzotriazole, 2-(2'-hydroxy-5'-methacryloyloxyethylphenyl)-2H-benzotriazole, 2-(2'-hydroxy-5'-methacryloyloxyethylphenyl)-5-chloro-2H-benzotriazole, 2-(2'-hydroxy-5'-methacryloyloxypropylphenyl)-2H-benzotriazole, or 2-(2'-hydroxy-5'-methacryloyloxyethyl-3'-t-butylphenyl)-2H-benzotriazole. 2-(2'-hydroxy-5'-methacryloyloxyethylphenyl)-2H-benzotriazole may be utilized in one or more embodiments in terms of cost and handleability.

In one or more embodiments, the constituent unit derived from the reactive ultraviolet absorber may constitute 0.01% to 5% by mass, and further 0.1% to 3% by mass, of the graft polymer layer (A2).

In the production of the graft copolymer particles (A), graft copolymerization of the monomer mixture (a-2) in the presence of acrylate cross-linked elastomer particles may produce a polymer component (free polymer) not graft-bonded to the acrylate cross-linked elastomer particles. The free polymer may constitute part or all of the acrylic resin constituting the matrix phase of the acrylic resin composition and the acrylic resin film.

A chain transfer agent may be added to the monomer mixture (a-2) to control the molecular weight of the polymer, to control the graft ratio to the cross-linked elastomer, to control the amount of free polymer not bonded to the cross-linked elastomer, and to control thermal stability by the decrease in the number of double bond ends of the polymer. The chain transfer agent may be the chain transfer agent that can be used to form the cross-linked elastomer by polymerization. In one or more embodiments, the amount of chain transfer agent to be used ranges from 0 to 2 parts by mass, and from 0 to 0.5 parts by mass, per 100 parts by mass of the monomer mixture (a-2).

In one or more embodiments, the graft ratio of the monomer mixture (a-2) to the cross-linked elastomer particles may range from 5% to 250%, from 10% to 200%, and further from 20% to 150%. A graft ratio of less than 5% tends to result in an acrylic resin film with low flex whitening resistance, low transparency, or more cracking in secondary forming due to low elongation at break. A graft ratio of more than 250% tends to result in an acrylic resin film with poor formability due to high melt viscosity in film forming.

The average particle size d (nm) of the cross-linked elastomer particles in the acrylic resin film and the amount w (% by mass) of the polyfunctional monomer for use in the acrylate cross-linked elastomer have a great influence on the stress whitening, elongation in secondary forming, and transparency of the film. Thus, the d and w may satisfy the relational expression: $0.015d \leq w \leq 0.06d$, further $0.02d \leq w \leq 0.05d$ in one or more embodiments. When the amount of the polyfunctional monomer satisfies the relational expression, advantageously, an acrylic resin film for use in one or more embodiments is less likely to have decreased elongation in secondary forming, is less likely to cause cracking in shape processing or cutting, has high transparency, and is less likely to have stress whitening on bending or on tensile deformation.

As described above, like the graft copolymer particles (A), the graft copolymer particles (B) include a cross-linked elastomer (B1). Like the graft copolymer particles (A), the graft copolymer particles (B) typically include a graft polymer layer (B2) located closer to the surface layer than the cross-linked elastomer (B1). Thus, in one or more embodiments the graft copolymer particles (B) may include the cross-linked elastomer (B1) and the graft polymer layer (B2). The raw materials and production method of the graft copolymer particles (B) are almost the same as the graft copolymer particles (A) except that the graft copolymer particles (B) have a larger average particle size than the graft copolymer particles and that the graft polymer layer (B2) has any constituent unit ratio. In one or more embodiments, the particles of the cross-linked elastomer (B1) may be based on an acrylate have a concentric spherical multilayer structure including a hard or semi-hard polymer core particle in a cross-linked elastomer layer. Examples of the core particle include hard cross-linked methacrylate resin particles as described in Japanese Examined Patent Application Publication No. 55-27576 and cross-linked particles with a methyl methacrylate-acrylate-styrene copolymer semi-hard layer as described in Japanese Unexamined Patent Application Publication No. 4-270751 or WO 2014/41803. Such a core particle can improve the transparency, flex whitening resistance, and flex cracking resistance of the graft copolymer particles (B), which have a larger particle size than the graft copolymer particles (A). In one or more embodiments, the graft copolymer particles (B) may have an average particle size in the range of 150 to 400 nm, further in the range of 200 to 350 nm.

The graft copolymer particles (B) have a larger particle size than the graft copolymer particles (A). The graft copolymer particles (B) with a larger particle size more effectively induce plastic deformation (crazing) in the acrylic resin phase surrounding the graft copolymer particles in response to an external force acting on the acrylic resin material. Thus, the graft copolymer particles (B) have a significant effect of imparting impact resistance and crack resistance to the acrylic resin material. The graft copolymer particles (B), however, have lower flex whitening resistance and solvent whitening resistance than the graft copolymer particles (A). Thus, the addition of a small amount of the graft copolymer particles (B) to the acrylic resin material composed of the acrylic resin and the graft copolymer particles (A) efficiently improves the fracture resistance and secondary formability of a laminated film including a functional layer formed by applying a coating liquid containing an organic solvent to an acrylic resin film, without increasing whitening during application or shape processing.

The average particle sizes of the graft copolymer particles (A) and the graft copolymer particles (B) can be measured in the latex state by a light scattering method using a laser diffraction particle size distribution analyzer, such as Microtrac particle size distribution analyzer MT3000 manufactured by Nikkiso Co., Ltd.

The graft copolymer particles (A) and the graft copolymer particles (B) may be produced by any method, for example, a known emulsion polymerization method, miniemulsion polymerization method, suspension polymerization method, bulk polymerization method, solution polymerization method, or dispersion polymerization method. The emulsion polymerization method is may be utilized in one or more embodiments due to its high adjustability of the resin structure.

A known initiator, such as an organic peroxide, an inorganic peroxide, or an azo compound, may be used without limitation to form the graft copolymer particles (A) or the graft copolymer particles (B) by the emulsion polymerization. More specifically, the initiator may be an organic peroxide, such as t-butyl hydroperoxide, 1,1,3,3-tetramethylbutyl hydroperoxide, succinic acid peroxide, peroxy maleic acid t-butyl ester, cumene hydroperoxide, benzoyl peroxide, or lauroyl peroxide; an inorganic peroxide, such as potassium persulfate, sodium persulfate, or ammonium persulfate; or an azo compound, such as azobisisobutyronitrile. These may be used alone or in combination.

These initiators may be used as thermal decomposition type radical polymerization initiators or redox type polymerization initiators in which sodium sulfite, sodium thiosulfate, sodium formaldehyde sulfoxylate, ascorbic acid, hydroxyacetone acid, iron (II) sulfate, or iron (II) sulfate and a reducing agent, such as ethylenediaminetetraacetic acid-2-sodium complex, are combined.

Among these, in terms of polymerization stability and particle size control, provided in one or more embodiments may be inorganic peroxides, such as potassium persulfate, sodium persulfate, and ammonium persulfate, and redox initiators in which an organic peroxide, such as t-butyl hydroperoxide or cumene hydroperoxide, is combined with an inorganic reducing agent, such as a divalent iron salt, and/or an organic reducing agent, such as sodium formaldehyde sulfoxylate, reducing sugar, or ascorbic acid.

The inorganic peroxide or organic peroxide may be added by any known method, for example, added directly to the polymerization system, added after mixed with monomers, or added after dispersed in an aqueous emulsifier solution. In terms of the transparency of the acrylic resin film, the inorganic peroxide or organic peroxide may be added in one or more embodiments after mixed with monomers or after dispersed in an aqueous emulsifier solution.

Any surfactant may be used in the emulsion polymerization of the graft copolymer particles (A) or the graft copolymer particles (B). Various known surfactants may be used in the emulsion polymerization. Examples of surfactants include anionic surfactants, such as sodium alkyl sulfonate, sodium alkylbenzene sulfonate, dioctyl sodium sulfosuccinate, sodium alkyl sulfate, fatty acid sodium, sodium alkyl phosphate, sodium alkyl ether phosphate, sodium alkyl phenyl ether phosphate, and surfactin sodium salts, and nonionic surfactants, such as reaction products between alkylphenols or aliphatic alcohols and propylene oxide and/or ethylene oxide. These surfactants may be used alone or in combination.

The graft copolymer particles (A) or the graft copolymer particles (B) can be separated and collected by a known method from a latex of the graft copolymer particles (A) or the graft copolymer particles (B) formed by emulsion polymerization. For example, the graft copolymer particles (A) or the graft copolymer particles (B) can be collected by adding a water-soluble electrolyte to the latex to coagulate the latex and washing and drying the solid component. The graft copolymer particles (A) or the graft copolymer particles (B) can be separated and collected by spray drying or lyophilization of the latex.

In one or more embodiments, to reduce appearance defects and internal foreign materials in the acrylic resin film, a latex of the graft copolymer particles (A) or the graft copolymer particles (B) may be passed through a filter or mesh to remove substances responsible for foreign material defects, such as environmental foreign materials and polymerization scales, before the graft copolymer particles (A) or the graft copolymer particles (B) are separated and collected.

The aperture of the filter or mesh may be, for example, at least twice the average particle size of the graft copolymer particles (A) or the graft copolymer particles (B) in one or more embodiments. The filter or mesh may be a known filter or mesh used in the filtration of a liquid medium. The form, aperture, filtration precision, and filtration capacity of the filter or mesh depend on the target application and the type, size, and amount of foreign materials to be removed.

In one or more embodiments, the total amount of the cross-linked elastomer (A1) and the cross-linked elastomer (B1) may be 15 parts or less by mass, 1 to 15 parts by mass, 5 to 15 parts by mass, and further 10 to 15 parts by mass, per 100 parts by mass of the acrylic resin film. When the total amount of the cross-linked elastomer (A1) and the cross-linked elastomer (B1) is 15 parts or less by mass, the acrylic resin film has high surface hardness of HB or higher, has sufficient tensile elongation at room temperature, and easily has a good balance between surface hardness and toughness.

The amounts of the graft copolymer particles (A) and the graft copolymer particles (B) in the acrylic resin film are not particularly limited, provided that the specified conditions for the contents are satisfied. In one or more embodiments, the graft copolymer particles (A) may constitute 1% to 40% by mass of the acrylic resin film. In one or more embodiments, the graft copolymer particles (B) may constitute 5% or less by mass of the acrylic resin film.

<Method for Producing Acrylic Resin Film>

The acrylic resin film can be produced by a known processing method. More specifically, the known processing method may be a melt processing method, a calendering method, a press forming method, or a solvent casting method. The melt processing method may be an inflation process or a T-die extrusion process. In the solvent casting method, an acrylic resin composition is dissolved or dispersed in a solvent, and the dispersion liquid is casted in the film form on a belt-like base. The solvent is then volatilized from the cast film of the dispersion liquid to form an acrylic resin film. Among one or more embodiments of these methods, the melt processing method using no solvent, particularly the T-die extrusion process may be used. Films with good surface properties can be produced by the melt processing method with high productivity. The melt processing method can reduce natural environmental and work environmental loads due to solvents and reduce production costs.

When an acrylic resin film is formed from an acrylic resin composition by the melt processing method or the solvent casting method, to improve the appearance quality of the acrylic resin film, in one or more embodiments the acrylic resin composition may be passed through a filter or mesh to remove environmental foreign materials, polymerization scales, and degraded resin responsible for appearance defects and internal foreign materials in the acrylic resin film.

In the production of a film by melt processing, filtration can be performed at one or more time points when an acrylic resin composition is prepared by melt blending, when the molten acrylic resin composition is pelletized, and/or when the film is formed with a T-die. In the solvent casting method, filtration may be performed after the acrylic resin, the graft copolymer particles (A), and the graft copolymer particles (B) are mixed with the solvent and before cast film formation.

The filter or mesh may be any known filter or mesh that has heat resistance and durability depending on the melt processing conditions and that has resistance to solvents for casting. Filters with high filtration capacity and with less residual molten resin responsible for degraded resin and cross-linked materials that impair film quality may be utilized in one or more embodiments to produce acrylic resin films, in particular high-quality acrylic resin films, by melt processing. For example, leaf disk filters and pleated filters may be used in one or more embodiments in terms of filtration efficiency and productivity.

In the production of an acrylic resin film, if necessary, both sides of a molten film can be simultaneously brought into contact with a chill roll or a cooling belt (put between chill rolls or cooling belts) to form a film with better surface properties. In one or more such embodiments, a molten film may be simultaneously brought into contact with a roll or a metal belt at a temperature of (the glass transition temperature of the acrylic resin composition) 80° C. or lower, and further (the glass transition temperature of the acrylic resin composition) 70° C. or lower.

In one or more embodiments, smooth films with less internal strain can be formed by transferring a roll mirror surface using, as at least one of rolls for such pinching, a roll with an elastic metal sleeve, for example, as disclosed in Japanese Unexamined Patent Application Publication No. 2000-153547 or No. 11-235747, at a low pinching pressure.

Depending on the purpose, formed films can be uniaxially or biaxially stretched. Uniaxial or biaxial stretching can be performed with a known stretching machine. Biaxial stretching can be performed by a known method, such as by sequential biaxial stretching, by simultaneous biaxial stretching, or by longitudinal stretching followed by transverse stretching with longitudinal relaxation to reduce bowing of the film.

As required by the application, any surface profile, such as hairline, prism, asperities, or a matte surface, may be formed on one or both sides of the acrylic resin film. Such a surface profile may be formed by a known method. For example, both sides of a molten film just extruded or a formed film fed by a feeder are put between two rolls or belts having a particular surface profile on at least one surface to transfer the surface profile.

A known additive agent for use in acrylic resin films may be added to the acrylic resin composition for forming the acrylic resin film without losing the advantages of one or more embodiments of the present disclosure. Such an additive agent may be an antioxidant, an ultraviolet absorber, a light stabilizer, a light-diffusing agent, a flatting agent, a lubricant, a colorant, such as a pigment or dye, an organic or inorganic particle anti-blocking agent, a metal or metal oxide infrared reflecting agent, a plasticizer, or an antistatic agent. Other additive agents may also be used. Any amount of such an additive agent depending on the type of the additive agent may be used without compromising one or more embodiments of the present disclosure.

The acrylic resin film may have any thickness for each use. The thickness of the acrylic resin film used as a base of a laminated film is determined in consideration of the thickness of a functional layer of the laminated film other than the base. For example, in one or more embodiments the acrylic resin film may have a thickness in the range of 20 to 500 μm, and further in the range of 40 to 300 μm.

The acrylic resin film has high organic solvent resistance, as described above. Thus, in one or more embodiments the acrylic resin film may be used as a target to which a liquid containing an organic solvent is to be applied. The liquid containing an organic solvent is not particularly limited and may be a cleaning liquid. In one or more embodiments, the liquid containing an organic solvent may be a coating liquid for forming a functional layer, and/or a coating liquid for forming a hard coat layer.

<<Laminated Film>>

The laminated film includes the acrylic resin film and at least one functional layer. The laminated film may have a functional layer on its one side or on both sides. In one or more embodiments, the functional layer may be in direct contact with at least one surface of the acrylic resin film.

The functional layer is not particularly limited. The functional layer may be any known functional layer.

Specific examples of the functional layer include a hard coat layer, a low-refractive-index layer, a high-refractive-index layer, an antiglare layer, a light diffusion layer, a matte layer, an anti-fingerprint layer, an antifouling layer, an antistatic layer, a polarization layer, a coloring layer, a design layer, an emboss layer, a light-shielding layer, a reflective layer, an electrically conductive layer, a gas barrier layer, a gas absorbing layer, an adhesive layer, and a primer layer. The laminated film may include two or more of these functional layers in combination. One functional layer may have two or more functions.

Each functional layer may have any thickness depending on the intended use and function of the laminated film. In one or more embodiments, the laminated film may have a thickness in the range of 20 to 500 μm, further in the range of 40 to 300 μm. The laminated film with a thickness in these ranges has high forming processability, is easy to coil, and has fewer creases when coiled.

In one or more embodiments, the laminated film may include at least one hard coat layer among the functional layers, because the laminated film can have high chemical resistance and stain resistance and is suitable for the production of molded articles. In one or more embodiments, the laminated film with a hard coat layer may include a low-refractive-index layer on the hard coat layer and may include a high-refractive-index layer between the hard coat layer and the low-refractive-index layer. The laminated film including a low-refractive-index layer or a low-refractive-index layer and a high-refractive-index layer on a hard coat layer can have lower reflectance on its surface.

The laminated film may be produced by any method for forming a desired number of functional layers of the desired type on the acrylic resin film serving as a base film. The functional layer(s) may be formed on the base film by lamination or by using a coating liquid for forming the functional layer(s). The functional layer(s) may be formed on the base film via a primer, an adhesive, or an adhesive film. In one or more embodiments, each functional layer may be formed by a method that uses a coating liquid containing an organic solvent for forming a functional layer, because the method facilitates uniform processing on a base film with a large area or can form a functional layer with high adhesiveness to the base film.

When a coating liquid containing an organic solvent for forming a functional layer is used to form the functional layer on a base film, the surface of the base film may be slightly dissolved in the coating liquid for forming the functional layer at the interface between the base film and the functional layer, and a mixture region of the acrylic resin base and a constituent material of the functional layer may be formed. Thus, the functional layer formed by using the coating liquid containing an organic solvent for forming the functional layer is rarely detached from the base film.

A typical method for producing a laminated film includes applying a coating liquid containing an organic solvent for forming a functional layer to at least one surface of the acrylic resin film to form a coating film, and drying or drying and curing the coating film to form the functional layer.

The coating liquid may be applied by any method. The application method may be a reverse coating method, a gravure coating method, a bar coating method, a die coating method, a spray coating method, a kiss coating method, a wire bar coating method, or a curtain coating method. The coating film may be dried at any temperature at which the organic solvent can be removed from the coating film. The drying temperature is determined such that the acrylic resin film is not deformed. The curing method may be any method that can form the desired functional layer. The curing method depends on the composition of the coating liquid. The coating film is typically cured by heating or by energy beam exposure, such as ultraviolet light exposure. A coating liquid with a moisture curing composition may be cured by leaving the coating film still instead of heating or exposure.

A hard coat layer serving as an appropriate functional layer of the laminated film is described in detail below.

<Hard Coat Layer>

The hard coat layer may be any hard coat layer that has been formed in various laminated films and resin molded products. For example, the hard coat layer can be formed by curing a monomer, oligomer, or resin with a radical reactive functional group, such as a polyfunctional (meth)acrylate, an epoxy acrylate, a urethane acrylate, a polyester acrylate, a silicon acrylate, a polycarbonate acrylate, or a polyacrylic acrylate, or a composition containing a mixture thereof. For example, the hard coat layer can be formed by curing a monomer, oligomer, or resin with a cationic or anionic curing functional group, such as an epoxy group or an oxetane group, or a composition containing a mixture thereof. The hard coat layer can also be formed by thermally curing a polysiloxane resin produced by hydrolysis and partial condensation of an alkoxy group substituted silyl compound or can also be formed by introducing a reactive functional group into a silyl compound and allowing the silyl compound to react for curing. These components used to form the hard coat layer may be used alone or in combination. Among these one or more embodiments, a composition that can form a hard coat layer with an elongation at break of 10% or more at room temperature (120° C.) may be utilized in terms of the secondary formability of the laminated film.

The urethane acrylate resin can be produced by mixing a polyhydric alcohol, a polyvalent isocyanate, and an acrylate with a hydroxy group and/or a methacrylate with a hydroxy group and allowing the isocyanate group and the hydroxy group to react to form a urethane bond.

The urethane acrylate resin may have any characteristics that depend on the structure of the polyhydric alcohol, the type of the polyvalent isocyanate, and the number of acryloyl or methacryloyl groups ($CH_2$=CH—CO— or $CH_2$=C($CH_3$)—CO—) of the acrylate with a hydroxy group and/or the methacrylate with a hydroxy group. The urethane acrylate resin may also be a commercial ultraviolet-curable hard coat material.

The (meth)acrylate with a hydroxy group may be, but is not limited to, a (meth)acrylate with a hydroxy group, for example, 2-hydroxyethyl acrylate or 2-hydroxyethyl methacrylate. In addition to these, if necessary, a compound with at least one hydroxy group and with an ethylenically unsaturated bond can be added, for example, 2-hydroxypropyl (meth)acrylate, 4-hydroxybutyl acrylate, polyethylene glycol mono(meth)acrylate, polypropylene glycol mono(meth)acrylate, trimethylolpropane mono(meth)acrylate, trimethylolpropane di(meth)acrylate, allyl alcohol, ethylene glycol allyl ether, glycerin monoallyl ether, glycerin diallyl ether, N-methylol (meth)acrylamide, of a mixture thereof.

The polyvalent isocyanate is not particularly limited. Examples of polyvalent isocyanate compounds, which are compounds with two or more isocyanate groups, include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 4,4'-diphenylmethane triisocyanate, 3,3'-dimethylphenylene diisocyanate, 4,4'-biphenylene diisocyanate, 1,6-hexane diisocyanate, isophorone diisocyanate, methylenebis(4-cyclohexyl isocyanate), 2,2,4-trimethylhexamethylene diisocyanate, bis(2-isocyanatoethyl) fumarate, 6-isopropyl-1,3-phenyl diisocyanate, 4-diphenylpropane diisocyanate, tolidine diisocyanate, hydrogenated diphenylmethane diisocyanate, hydrogenated xylylene diisocyanate, tetramethylxylylene diisocyanate, 2,5-bis(isocyanatomethyl)-bicyclo[2.2.1]heptane, 2,6-bis(isocyanatomethyl)-bicyclo[2.2.1]heptane, trimethylolpropane adducts of triethylene diisocyanate, isocyanurates of triethylene diisocyanate, diphenylmethane-4,4'-diisocyanate oligomers, biurets of hexamethylene diisocyanate, isocyanurates of hexamethylene diisocyanate, uretidiones of hexamethylene diisocyanate, and isocyanurates of isophorone diisocyanate. These polyisocyanates may be used alone or in combination.

Specific examples of the polyhydric alcohol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 3-methyl-1,5-pentanediol, neopentyl glycol, 2-methyl-1,8-octanediol, 1,4-cyclohexanedimethanol, and poly(tetramethylene glycol). These polyhydric alcohols may be used alone or in combination.

An organotin urethane-forming catalyst is used to promote the reaction with an isocyanate group of an isocyanate component. The organotin urethane-forming catalyst may be any catalyst that is typically used in the urethane reaction, for example, dibutyltin dilaurate, dibutyltin diacetate, dibutyltin dialkyl maleate, tin stearate, and tin octanoate. The appropriate amount of the organotin urethane-forming catalyst to be used is, but not limited to, in the range of 0.005% to 3% by mass. The urethane reaction proceeds insufficiently below the lower limit and is difficult to control above the upper limit due to heat generation.

The polyfunctional (meth)acrylate may be any (meth)acrylate with at least two (meth)acryloyl groups. More specifically, the polyfunctional (meth)acrylate may be dipentaerythritol hexa(meth)acrylate, dipentaerythritol penta(meth)acrylate, dipentaerythritol tetra(meth)acrylate, dipentaerythritol tri(meth)acrylate, pentaerythritol tetra(meth)acrylate, pentaerythritol tri(meth)acrylate, trimethylolpropane tri(meth)acrylate, trimethylolethane tri(meth)acrylate, hexanediol di(meth)acrylate, or diethylene glycol di(meth)acrylate. These may be used alone or in combination. The polyfunctional (meth)acrylate may also be a commercial ultraviolet-curable hard coat material.

The epoxy acrylate monomer is not particularly limited. More specifically, the epoxy acrylate monomer may be glycidyl (meth)acrylate, β-methylglycidyl (meth)acrylate, 3,4-epoxycyclohexylmethyl (meth)acrylate, or vinylcyclohexene monoxide (that is, 1,2-epoxy-4-vinylcyclohexane).

In one or more embodiments, a hard coat forming composition composed of a polysiloxane resin composition may be a curable composition that contains a condensate (A) produced by hydrolysis and condensation of a silane compound (I) with a hydrolyzable silyl group represented by the following general formula (I) and a catalyst or curing agent (B) for reaction of a reactive substituent.

$$R^1\!-\!(SiR^2_a(OR^3)_{3-a}) \tag{I}$$

(In the formula, $R^1$ denotes a monovalent hydrocarbon group selected from the group consisting of alkyl groups having 1 to 10 carbon atoms, aryl groups having 6 to 25 carbon atoms, and aralkyl groups having 7 to 12 carbon atoms, at least part of the ends of the monovalent hydrocarbon group being substituted with a reactive substituent selected from an epoxy group, an oxetane group, a (meth)acryloyl group, a vinyl group, a hydroxy group, a carboxy group, and an amino group optionally protected with a functional group, $R^2$ independently denotes a hydrogen atom or a monovalent hydrocarbon group selected from the group consisting of alkyl groups having 1 to 10 carbon atoms, aryl groups having 6 to 25 carbon atoms, and aralkyl groups having 7 to 12 carbon atoms, $R^3$ independently denotes a hydrogen atom or an alkyl group having 1 to 10 carbon atoms, and a denotes an integer in the range of 0 to 2.)

In one or more embodiments, the condensate (A) may have a weight-average molecular weight of 30,000 or less. In one or more embodiments, the silane compound with the reactive substituent may constitute 10% or more by mass of the whole. In this case, the cured product serving as a hard coat has high hardness, chemical resistance, and durability.

In one or more embodiments, the catalyst or curing agent (B) may be at least one catalyst or curing agent selected from photo radical generators, photo cation generators, and photo anion generators in terms of the photocurability of the composition.

In one or more embodiments, the reactive substituent in the general formula (I) may be an epoxy group or an oxetane group to reduce cure shrinkage in the formation of the hard coat layer and to form a laminated film with high durability and less curling.

In one or more embodiments, the catalyst for use in the hydrolytic condensation reaction of the silane compound (I) may be a neutral salt catalyst. This is because the neutral salt catalyst can easily reduce the decomposition of the reactive substituent in hydrolytic condensation when the reactive substituent is an epoxy group or an oxetane group.

The ratio Y/X of the number of moles Y of the $OR^3$ group directly bonded to the silicon atom of the condensate (A) to the number of moles X of the $OR^3$ group directly bonded to the silicon atom of the silane compound (I), which is a raw material of the condensate (A), in one or more embodiments may be 0.2 or less. This is because the cured product has high hardness, chemical resistance, and durability.

The resin composition can be cured by a known method to form a hard coat layer. In one or more embodiments, the curing method may be an active energy radiation method exemplified by an ultraviolet radiation method. For curing by active energy radiation, a photopolymerization initiator, a photo anion generator, and a photo cation generator are typically added to compositions for forming a hard coat layer.

Specific examples of the photopolymerization initiator include acetophenone, benzophenone, benzoyl methyl ether, benzoyl ethyl ether, benzoin isopropyl ether, benzoin isobutyl ether, dibenzyl, 1-hydroxy-cyclohexyl-phenyl-ketone, 2,2-dimethoxy-2-phenylacetophenone, tetramethylthiuram monosulfide, tetramethylthiuram disulfide, thioxanthone, 2-chlorothioxanthone, 2-methylthioxanthone, and 2-methyl-1-[4-(methylthio)phenyl]-2-morpholinopropan-1-one compounds. Among these, 1-hydroxy-cyclohexyl-phenyl-ketone may be utilized in one or more embodiments due to its high miscibility with resin.

Specific examples of the photo cation generator include CPI-100P, CPI-101A, CPI-200K, and CPI-200S manufactured by San-Apro Ltd.; WPI-124, WPI-113, WPI-116, WPI-169, WPI-170, and WPI-124 manufactured by Wako Pure Chemical Industries, Ltd.; and Rhodorsil 2074 manufactured by Rhodia.

Specific examples of the photo anion generator include acetophenone o-benzoyloxime, nifedipine, 2-(9-oxoxanthen-2-yl)propionic acid 1,5,7-triazabicyclo [4.4.0] deca-5-ene, 2-nitrophenylmethyl 4-methacryloyloxypiperidine-1-carboxylate, 1,2-diisopropyl-3-[bis(dimethylamino) methylene] guanidium 2-(3-benzoylphenyl)propionate, 1,2-dicyclohexyl-4,4,5,5-tetramethylbiguanidium, and n-butyltriphenylborate.

To cure a coating film of a curable composition to form a hard coat layer, the curable composition may contain a known leveling agent to improve coating performance. The leveling agent may be a fluorinated leveling agent, an acrylic leveling agent, a silicone leveling agent, or an addition product or mixture thereof. The amount of leveling agent to be used is, but not limited to, in the range of 0.03 to 3.0 parts by mass per 100 parts by mass of the curable composition, for example.

To apply a curable composition to form a hard coat layer, in addition to the curable resin, the curable composition may contain various additive agents, such as an ultraviolet absorber, a light stabilizer, an antifoaming agent, an antioxidant, a light-diffusing agent, a flatting agent, an antifoulant, a lubricant, a colorant, such as a pigment or dye, organic particles, inorganic fine particles, and an antistatic agent, as required. Other additive agents may also be used.

To impart appropriate coating performance to a curable composition, an organic solvent is added to the curable composition. The organic solvent may be any organic solvent that can impart the desired coating performance to the curable composition, provided that a hard coat layer with the desired thickness and performance can be formed. In one or more embodiments, the organic solvent may have a boiling point in the range of 50° C. to 150° C. in terms of coating performance and the drying characteristics of the coating film.

Specific examples of the organic solvent include saturated hydrocarbons, such as hexane; aromatic hydrocarbons, such as toluene and xylene; halogenated hydrocarbons, such as chloroform and methylene chloride; alcohols, such as methanol, ethanol, isopropyl alcohol, and butanol, esters, such as methyl acetate, ethyl acetate, and butyl acetate; ketones, such as acetone, methyl ethyl ketone, methyl isobutyl ketone, and cyclohexanone; ethers, such as tetrahydrofuran, dioxane, propylene glycol monoethyl ether, methyl cellosolve, and ethyl cellosolve; and amides, such as N-methyl pyrrolidone and dimethylformamide. The organic solvents may be used alone or in combination.

The curable composition can be applied by any method to the acrylic resin film serving as a base film. The application method may be a reverse coating method, a gravure coating method, a bar coating method, a die coating method, a spray coating method, a kiss coating method, a wire bar coating method, or a curtain coating method. These application methods may be performed alone or in combination.

After the curable composition for forming a hard coat layer is applied to the surface of the acrylic resin film base, a hard coat layer is formed by drying the coating film to remove the organic solvent and by curing the coating film by exposure to ultraviolet light or the like.

To remove the organic solvent by drying, in one or more embodiments the drying temperature of the coating film may range from 60° C. to 120° C., and further from 70° C. to 100° C. The organic solvent may remain in the coating film at an excessively low drying temperature. On the other hand, at an excessively high drying temperature, the base film may be thermally deformed, and the laminated film may lose flatness.

In one or more embodiments, the ultraviolet light for curing the coating film may have a wavelength in the range of 200 to 400 nm. The ultraviolet radiation conditions depend on the type of component and composition of the curable composition. The irradiation apparatus for exposure light, such as ultraviolet light, may include a lamp light source, such as a high-pressure mercury lamp, a low-pressure mercury lamp, a metal halide lamp, an electrodeless lamp, or an excimer lamp, or a pulse or continuous laser source, such as an argon ion laser or a helium neon laser.

<High-Refractive-Index Layer>

The high-refractive-index layer is typically formed by curing a high-refractive-index layer composition. The high-refractive-index layer has an antireflection effect due to its significant refractive index difference from the hard coat layer and from a low-refractive-index layer described later. A known layer for use in antireflection films may be used as the high-refractive-index layer without limitation. The high-refractive-index layer composition may be composed of an organic base material to which an inorganic material for adjusting the refractive index is added as required. The composition for use in the hard coat layer may be used as the organic material without limitation. The inorganic material for adjusting the refractive index may be zinc oxide, titanium oxide, cerium oxide, aluminum oxide, silane oxide, antimony oxide, zirconium oxide, tin oxide, or ITO fine particles. Various additive agents may be added as other components to the high-refractive-index layer composition without losing the advantages of one or more embodiments of the present disclosure. Examples of the additive agents include polymerization initiators, dispersants, surfactants, light stabilizers, and leveling agents.

<Low-Refractive-Index Layer>

The low-refractive-index layer is typically formed by curing a low-refractive-index layer composition. A known layer for use in antireflection films may be used as the low-refractive-index layer without limitation. The low-refractive-index layer composition may be composed of an organic base material to which a material for adjusting the refractive index is added as required. The composition for use in the hard coat layer may be used as the organic material without limitation. The material for adjusting the refractive index may be silica fine particles, hollow silica fine particles, or fluoride fine particles. The fluoride fine particles include a fluoride, such as magnesium fluoride, lithium fluoride, aluminum fluoride, or calcium fluoride. To impart antifouling properties to the low-refractive-index layer, the organic material may be partially replaced with a water-repellent material or an oil-repellent material. The water-repellent or oil-repellent material may typically be a wax material. Various additive agents may be added as other components to the low-refractive-index layer composition without losing the advantages of one or more embodiments of the present disclosure. Examples of the additive agents include photopolymerization initiators, dispersants, surfactants, light stabilizers, leveling agents, and anti-fingerprint agents.

<<Molded Article>>

Molded articles include the acrylic resin film and/or the laminated film. In one or more embodiments, such molded articles can be used for surface protection and decorative applications of formed products and members with three-dimensional shapes or three-dimensional designs, such as vehicle interior materials, construction materials, and electrical and electronic device housings. The molded articles are also suitable for applications in which at least part of the surface of a member formed of thermoplastic resin or curable resin is covered. Examples of thermoplastic resins used as materials of members include polycarbonate resins with a bisphenol skeleton, a fluorene skeleton, or an isosorbide skeleton, acrylic resins, styrene resins (AS resins, ABS resins, MAS resins, styrene maleimide resins, styrene maleic anhydride resins, etc.), saturated polyester resins, poly(vinyl chloride) resins, polyarylate resins, PPS resins, POM resins, polyamide resins, poly(lactic acid) resins, cellulose acylate resins, and polyolefin resins. Examples of curable resins include epoxy resins, vinyl ester resins, unsaturated polyester resins, phenolic resins, melamine resins, and benzoxazine resins. In one or more embodiments, the molded articles may be suitable for surface coverage applications of members formed of transparent resins, such as polycarbonate resins, acrylic resins, styrene resins, polyarylate resins, and polyolefin resins.

Specific examples of the applications of the molded articles include automotive interior applications, such as instrument panels, in-vehicle display front panels, console boxes, meter covers, door lock bezels, steering wheels, power window switch bases, center clusters, and dashboards; automobile exterior applications, such as weather strips, bumpers, bumper guards, side mud guards, body panels, spoilers, front grilles, strut mounts, wheel caps, center pillars, door mirrors, center ornaments, side moldings, door moldings, wind moldings, windows, headlight covers, taillight covers, and windshield parts; household electrical and electronic devices, such as housings, display windows, and buttons of mobile phones of portable electronic devices, such as smartphones, mobile phones, and tablets, television sets, DVD players, stereo equipment, rice cookers, washing machines, refrigerators, air conditioners, humidifiers, dehumidifiers, and fans; housings, front panels, buttons, emblems, and facings of furniture products, and furniture exterior applications; interior building material applications, such as wall surfaces, ceilings, floors, bathtubs, and toilet seats; exterior building material applications, such as external walls, such as sidings, roofs, gates, and bargeboards; facing applications of furniture, such as window frames, doors, railing thresholds, and lintels; optical component applications, such as displays, lenses, mirrors, goggles, and windowpanes; and interior and exterior applications of various vehicles other than automobiles, such as trains, aircraft, and ships.

The acrylic resin film and/or the laminated film can be used to easily produce molded articles with a complex three-dimensional shape, with controlled surface hardness, scratch resistance, chemical resistance, antifouling properties, reflection characteristics, and antiglare properties, and with good appearance. Thus, in one or more embodiments the molded articles may be utilized, for example, in in-vehicle display front panels with a planar, curved, or three-dimensional shape among the above applications.

Molded articles including the acrylic resin film and/or the laminated film can be placed on the surface of formed products and members by any known method. In particular, a surface decorative or surface protective method for forming a layer of the acrylic resin film and/or the laminated film on the surface of formed products and members with a three-dimensional shape may be a film in-mold forming method or a film insert molding method similar to the methods described in Japanese Examined Patent Application Publication No. 63-6339, Japanese Examined Patent Application Publication No. 4-9647, Japanese Unexamined Patent Application Publication No. 7-9480, Japanese Unexamined Patent Application Publication No. 8-323934, and Japanese Unexamined Patent Application Publication No. 10-279766 or a three-dimensional lamination method similar to the methods described in Japanese Patent No. 3733564 and Japanese Patent No. 3924760. In the film in-mold forming method or the film insert molding method, the acrylic resin film and/or the laminated film, on which a printed decorative layer, a backer sheet, and/or an adhesive layer is optionally placed, is shaped in advance by vacuum forming, air-pressure forming, or hot press forming or is not shaped to form a decorative film, and while the decorative film is placed in an injection mold a thermoplastic resin is injected into the mold cavity to integrate the decorative film with the surface of the injection molded product. Likewise, in the three-dimensional lamination method, a printed decorative layer and/or a backer sheet and then an adhesive layer are placed on the acrylic resin film and/or the laminated film, and the decorative film with the adhesive layer is thermally softened and is bonded to the surface of a formed product under vacuum or under pressure. The resin temperature, the forming conditions, and the presence or absence of a printed layer, a decorative layer, a deposited layer, an adhesive layer, a three-dimensional design, such as an emboss shape, and/or a backer sheet on the acrylic resin film and/or the laminated film can be appropriately determined in consideration of the forming method, the type of base resin, and the intended application.

EXAMPLES

One or more embodiments of the present disclosure is further described in the following examples. One or more embodiments are not limited to these examples. "Part" and "%" in the production examples, examples, and comparative examples represent "part by mass" and "% by mass", respectively.

Production Example 1: Graft Copolymer Particles (A)

An 8-L polymerization apparatus equipped with a stirrer was charged with the following materials.

deionized water 200 parts
dioctyl sodium sulfosuccinate 0.24 parts
sodium formaldehyde sulfoxylate 0.15 parts
ethylenediaminetetraacetic acid-2-sodium 0.001 parts
iron (II) sulfate 0.00025 parts The interior of the polymerization apparatus was fully replaced with nitrogen gas to substantially remove oxygen. The internal temperature of the polymerization apparatus was then set to 60° C. Then, 30 parts of the following monomer mixture was continuously added to the polymerization apparatus at a rate of 10 parts by mass/hour. After the completion of the addition, the polymerization was continued another 0.5 hours, and particles of the cross-linked elastomer (A1) (average particle size: 80 nm) were formed. The polymerization conversion was 99.5%.

Monomer Mixture:
vinyl monomer mixture (n-butyl acrylate (BA) 90% and methyl methacrylate (MMA) 10%) 30 parts
  allyl methacrylate (AlMA) 1 part
  cumene hydroperoxide (CHP) 0.2 parts Subsequently, 0.05 parts by mass of dioctyl sodium sulfosuccinate was charged into the polymerization apparatus. The internal temperature of the polymerization apparatus was then set to 60° C., and 70 parts of a monomer mixture composed of 70 parts of a vinyl monomer mixture (MMA 98%, BA 1%, and RUVA 1%) for forming the graft polymer layer (A2), 0.5 parts of tertiary dodecyl mercaptan (t-DM), and 0.5 parts of CHP was continuously added to the polymerization apparatus at a rate of 10 parts/hour. The polymerization was continued another 1 hour, and graft copolymer particles (average particle size: 90 nm) were formed. The polymerization conversion was 98.2%. The resulting latex was salted out and coagulated with calcium chloride, and the coagulated solid component was washed with water and was dried. Thus, a graft copolymer particle powder was produced. The RUVA is a reactive ultraviolet absorber (2-(2'-hydroxy-5'-methacryloyloxyethylphenyl)-2-H-benzotriazole (manufactured by Otsuka Chemical Co., Ltd., RUVA-93)).

Production Examples 2 to 8: Graft Copolymer Particles (A)

Graft copolymer particles according to production examples 2 to 8 were formed in the same manner as in the production example 1 except that the composition of the vinyl monomer composition for producing the cross-linked elastomer (A1) and the composition of the vinyl monomer composition for producing the graft polymer layer (A2) were changed as shown in Table 1. The average particle size of the cross-linked elastomer particles and the average particle size of the graft copolymer particles in the graft copolymer particles according to the production examples 2 to 8 were the same as in the production example 1.

TABLE 1

| | | Production Example | | | | | | | |
|---|---|---|---|---|---|---|---|---|---|
| | | 1 | 2 | 3 | 4 | 5 | 6 | 7 | 8 |
| Core (Cross-linked elastomer (A1)) | MMA (% by mass) | 10 | 10 | 10 | 10 | 10 | 10 | 10 | 10 |
| | BA (% by mass) | 90 | 90 | 90 | 90 | 90 | 90 | 90 | 90 |
| | parts by mass | 30 | 30 | 30 | 30 | 30 | 30 | 30 | 30 |
| Shell (Graft polymer layer (A2)) | MMA (% by mass) | 98 | 99 | 97 | 96 | 94 | 92 | 85 | 80 |
| | BA (% by mass) | 1 | 1 | 3 | 4 | 6 | 8 | 15 | 20 |
| | RUVA (% by mass) | 1 | 0 | 0 | 0 | 0 | 0 | 0 | 0 |
| | parts by mass | 70 | 70 | 70 | 70 | 70 | 70 | 70 | 70 |

Production Example 9: Graft Copolymer Particles (A)

An 8-L polymerization apparatus equipped with a stirrer was charged with the following materials.
  deionized water 200 parts
  dioctyl sodium sulfosuccinate 0.25 parts
  sodium formaldehyde sulfoxylate 0.15 parts
  ethylenediaminetetraacetic acid-2-sodium 0.001 parts
  iron (II) sulfate 0.00025 parts The interior of the polymerization apparatus was fully replaced with nitrogen gas to substantially remove oxygen. The internal temperature of the polymerization apparatus was then set to 60° C. A liquid mixture of 30 parts of a vinyl monomer mixture (BA 90% and MMA 10%), 0.9 parts of allyl methacrylate, and 0.2 parts of CHP was then continuously added to the polymerization apparatus for 3 hours. After the completion of the addition, the polymerization was continued for 0.5 hours, and cross-linked elastomer particles were formed. The polymerization conversion was 99.5%.

Subsequently, 0.05 parts of dioctyl sodium sulfosuccinate was charged into the polymerization apparatus. The internal temperature of the polymerization apparatus was then set to 60° C., and a liquid mixture of 70 parts of a vinyl monomer mixture (BA 10% and MMA 90%) and 0.2 parts of CHP was continuously added to the polymerization apparatus for 5 hours. The polymerization was continued another 1 hour, and a latex of graft copolymer particles was obtained. The polymerization conversion was 98.5%. The resulting latex was salted out and coagulated with calcium chloride, and the coagulated solid component was washed with water and was dried. Thus, a white powder of graft copolymer particles was produced. The graft copolymer particles had an average particle size of 80 nm.

Production Example 10: Graft Copolymer Particles (B)

An 8-L polymerization apparatus equipped with a stirrer was charged with the following materials.
  deionized water 180 parts
  polyoxyethylene lauryl ether phosphoric acid 0.002 parts
  boric acid 0.4725 parts
  sodium carbonate 0.04725 parts
  sodium hydroxide 0.0098 parts The interior of the polymerization apparatus was fully replaced with nitrogen gas to substantially remove oxygen. The internal temperature of the polymerization apparatus was then set to 80° C. A 2% aqueous solution of 0.027 parts of potassium persulfate was added to the polymerization apparatus, and a liquid mixture of 27 parts of a vinyl monomer mixture (MMA 97% and BA 3%) and 0.036 parts of allyl methacrylate was continuously added to the polymerization apparatus for 81 minutes. The polymerization was continued for another 60 minutes, and polymer particles constituting a first layer of the core (cross-linked elastomer (B1)) were formed. The polymerization conversion was 99.0%.

A 2% aqueous solution of 0.0267 parts of sodium hydroxide was then added to the polymerization apparatus. A 2% aqueous solution of 0.08 parts of potassium persulfate was then added to the polymerization apparatus. A liquid mixture of 50 parts of a vinyl monomer mixture (BA 83% and styrene (St) 17%) and 0.375 parts of allyl methacrylate was then continuously added to the polymerization apparatus for 150 minutes. After the completion of the addition, a 2% aqueous solution of 0.015 parts of potassium persulfate was added to the polymerization apparatus. The polymerization was then continued for 120 minutes, and the core (cross-linked elastomer (B1)) including the first layer and a second layer was formed. The polymerization conversion was 99.0%, and the average particle size was 230 nm.

A 2% aqueous solution of 0.023 parts of potassium persulfate was added to the polymerization apparatus. Then, 23 parts of a vinyl monomer mixture (MMA 80% and BA 20%) was continuously added to the polymerization apparatus for 45 minutes. The polymerization was continued for another 30 minutes, and a latex of graft copolymer particles (B1) with a two-layer structure composed of the core (cross-linked elastomer (B1)) and a shell (graft polymer layer (B2)) was produced. The polymerization conversion was 100.0%. The resulting latex was salted out and coagulated with magnesium sulfate, and the coagulated solid component was washed with water and was dried. Thus, a white powder of graft copolymer particles was produced. The graft copolymer particles had an average particle size of 250 nm.

Production Example 11: Graft Copolymer Particles (B)

An 8-L polymerization apparatus equipped with a stirrer was charged with the following materials.
deionized water 220 parts
boric acid 0.3 parts
sodium carbonate 0.03 parts
sodium N-lauroyl sarcosinate 0.09 parts
sodium formaldehyde sulfoxylate 0.09 parts
ethylenediaminetetraacetic acid-2-sodium 0.006 parts
iron (II) sulfate 0.002 parts The interior of the polymerization apparatus was fully replaced with nitrogen gas to substantially remove oxygen. The internal temperature of the polymerization apparatus was then set to 80° C. A liquid mixture of 5 parts of a vinyl monomer composition (MMA 27%, BA 60%, and St 13%), 0.2 parts of allyl methacrylate, and 0.02 parts of t-butyl hydroperoxide was then added to the polymerization apparatus and was polymerized for 60 minutes. Thus, a latex of polymer particles constituting a first layer of the core (cross-linked elastomer (B1)) was produced. The polymerization conversion (the amount of polymerization product/the amount of charged monomers) was 98%.

The latex of polymer particles constituting the first layer of the core (cross-linked elastomer (B1)) was held in a nitrogen stream at 80° C., and 0.1 parts of potassium persulfate was added to the latex. A liquid mixture of 22 parts of a vinyl monomer composition (MMA 97% and BA 3%), 0.1 parts of allyl methacrylate, and 0.02 parts of t-butyl hydroperoxide was then continuously added to the latex for 70 minutes. After the completion of the addition of the liquid mixture, the liquid in the polymerization apparatus was held for 60 minutes for polymerization. Thus, polymer particles composed of the first layer and a second layer of the core (cross-linked elastomer (B1)) were formed.

A liquid mixture of 50 parts of a vinyl monomer composition (BA 83% and St 17%) and 1 part of allyl methacrylate was continuously added to the liquid in the polymerization apparatus for 150 minutes. After the completion of the addition of the liquid mixture, the liquid in the polymerization apparatus was held for 90 minutes, and a latex of core (cross-linked elastomer (B1)) particles with a three-layer structure was produced. The core (cross-linked elastomer (B1)) particles with a three-layer structure had an average particle size of 240 nm.

The latex of core (cross-linked elastomer (B1)) particles was held at 80° C., and 0.02 parts of potassium persulfate was added to the latex. Then, 23 parts of a vinyl monomer composition (MMA 80% and BA 20%) was continuously added to the latex for 1 hour. After the completion of the addition of the vinyl monomer composition, the liquid in the polymerization apparatus was held for 90 minutes, and a latex of graft copolymer particles composed of the core (cross-linked elastomer (B1)) with a three-layer structure and a shell (graft polymer layer (B2)) was produced. The polymerization conversion was 99%.

The latex of graft copolymer particles was salted out and coagulated with calcium chloride, and the coagulated solid component was heat-treated and dried. Thus, a white powder of graft copolymer particles was produced. The graft copolymer particles had an average particle size of 260 nm.

Production Example 12: Graft Copolymer Particles (B)

An 8-L polymerization apparatus equipped with a stirrer was charged with the following materials.
deionized water 220 parts
boric acid 0.3 parts
sodium carbonate 0.03 parts
sodium N-lauroyl sarcosinate 0.09 parts
sodium formaldehyde sulfoxylate 0.09 parts
ethylenediaminetetraacetic acid-2-sodium 0.006 parts
iron (II) sulfate 0.002 parts The interior of the polymerization apparatus was fully replaced with nitrogen gas to substantially remove oxygen. The internal temperature of the polymerization apparatus was then set to 80° C. Then, 25% of a liquid mixture of 25 parts of a vinyl monomer (MMA 100%), 1 part of allyl methacrylate, and 0.1 parts of t-butyl hydroperoxide was charged at a time into the polymerization apparatus and was polymerized for 45 minutes. The residual 75% of the liquid mixture was then continuously added to the polymerization apparatus for 1 hour. After the completion of the addition, the temperature was held for 2 hours to complete the polymerization. During this period, 0.2 parts of sodium N-lauroyl sarcosinate was added. Thus, a latex of polymer particles constituting a first layer of the core (cross-linked elastomer (B1)) was produced. The polymerization conversion (the amount of polymerization product/the amount of charged monomers) was 98%.

The latex of polymer particles constituting the first layer of the core (cross-linked elastomer (B1)) was held in a nitrogen stream at 80° C., and 0.1 parts of potassium persulfate was added to the latex. A liquid mixture of 50 parts of a vinyl monomer composition (BA 82% and St 18%) and 1 part of allyl methacrylate was then continuously added to the latex for 5 hours. During this period, 0.1 parts of potassium oleate was added in three steps to the latex. After the completion of the addition of the liquid mixture, 0.05 parts of potassium persulfate was added to complete the polymerization. After the addition of potassium persulfate, the liquid in the polymerization apparatus was held for 2 hours. Thus, particles of the core (cross-linked elastomer (B1)) with a two-layer structure composed of the first layer and a second layer were formed. The polymerization conversion was 99%.

The latex of the particles of the core (cross-linked elastomer (B1) with the two-layer structure was held at 80° C., and 0.02 parts of potassium persulfate was added to the latex. Then, 15 parts of a vinyl monomer composition (MMA 93.3% and BA 6.7%) was continuously added to the latex for 1 hour. After the completion of the addition of the vinyl monomer composition, the liquid in the polymerization apparatus was held for 1 hour, and a latex of particles composed of the core (cross-linked elastomer (B1)) with the two-layer structure and a first shell (graft polymer layer (B2) was produced. The polymerization conversion was 99%. The obtained particles had an average particle size of 230 nm.

The latex of the particles composed of the core (cross-linked elastomer (B1)) with the two-layer structure and the first shell (graft polymer layer (B2)) was held at 80° C., and 10 parts of a vinyl monomer composition (MMA 50% and BA 50%) was continuously added to the latex for 0.5 hours. After the completion of the addition of the vinyl monomer composition, the liquid in the polymerization apparatus was held for 1 hour, and a latex of graft copolymer particles composed of the core (cross-linked elastomer (B1)) with the two-layer structure and a shell (graft polymer layer (B2)) with a two-layer structure was produced. The polymerization conversion was 99%

The latex of graft copolymer particles was salted out and coagulated with calcium chloride, and the coagulated solid component was heat-treated and dried. Thus, a white powder of graft copolymer particles was produced. The graft copolymer particles had an average particle size of 250 nm.

Example 1

40 parts of the graft copolymer particles (graft copolymer particles (A)) according to the production example 1, 3.9 parts of the graft copolymer particles (graft copolymer particles (B)) according to the production example 10, and 56.1 parts of a methacrylate polymer (manufactured by Sumitomo Chemical Co., Ltd., Sumipex EX) were mixed in a Henschel mixer. A strand of an acrylic resin composition was then formed by melt-kneading in a 58-mmΦ single-screw extruder (manufactured by The Japan Steel Works, Ltd.) at a cylinder temperature in the range of 200° C. to 260° C., at a screw speed of 90 rpm, and at an ejection rate of 130 kg/h. The strand of the acrylic resin composition was cooled in a water tank and was cut with a pelletizer to form acrylic resin composition pellets.

The acrylic resin composition pellets were melt-kneaded in a 90-mmΦ single-screw extruder with a T-die at a cylinder set temperature in the range of 180° C. to 240° C. and at an ejection rate of 130 kg/h. The melt-kneaded acrylic resin composition was extruded from the T-die at a T-die temperature of 240° C. The extruded acrylic resin composition was cooled and solidified with a casting roll at 90° C. and with a chill roll at 60° C., forming an acrylic resin film 175 µm in thickness.

Examples 2 to 10, and Comparative Examples 1 to 16

The type and amount (parts) of the graft copolymer particles (A) and the type and amount (parts) of the graft copolymer particles (B) were described in Tables 2 to 4. Depending on the amounts of the graft copolymer particles (A) and the graft copolymer particles (B), the amount of the methacrylate polymer was adjusted such that the mass of the acrylic resin composition was 100 parts. Acrylic resin films 175 µm in thickness according to Examples 2 to 10 and Comparative Examples 1 to 16 were formed in the same manner as in Example 1 except for these adjustments.

The haze, elongation at break, functional cracking, cutter evaluation, pencil hardness, reflectance, 120° C. crack elongation, and flex whitening of the acrylic resin films according to the examples and comparative examples were evaluated by the following methods. Tables 2 to 4 show these evaluation results.

<Haze>

The haze values of the acrylic resin films were measured according to JIS K6174. The haze was measured on the acrylic resin film untreated (base), on a surface of the acrylic resin film to which a solvent (cyclohexanone) was applied (after the application of the solvent), and on a hard coat layer side of a laminated film including a hard coat layer on one side (formation of HC layer).

The hard coat layer was formed from a coating liquid for forming the hard coat (Z-879, urethane acrylate: manufactured by Aica Kogyo Co., Ltd.) diluted with methyl ethyl ketone to a solid content of 30% by mass.

<Elongation at Break>

The elongation at break was measured with a Tensilon tensile tester at a grip distance of 40 mm and at a crosshead speed of 200 mm/min. The elongation at break is the average of the measurements of five test specimens from which the highest value and the lowest value are removed. The elongation at break was measured in the acrylic resin film untreated (base), in the acrylic resin film to which a solvent (cyclohexanone) was applied (after the application of the solvent), and in a laminated film including a hard coat layer on one side (formation of HC layer).

Tables 2 to 4 list the measurements of elongation at break and the decrease in the elongation at break after the formation of the hard coat layer relative to the elongation at break of the base film.

<Functional Cracking>

Functional cracking was evaluated in the laminated film including the hard coat layer on one side (formation of HC layer). The laminated film including the hard coat layer was bent at a bending rate of 90 degrees/second with the hard coat layer side being protruded. Checking for a crack in the laminated film, the functional cracking was rated according to the following criteria. The bending test was performed at a temperature of 23° C.±2° C. and at a humidity of 50%±5%.

(Criteria)

A: In the bending test of three specimens, the three specimens had no crack.

B: In the bending test of three specimens, at least one specimen had a crack.

<Cutter Evaluation>

The cutter evaluation was performed in the laminated film including the hard coat layer on one side (formation of HC layer). The hard coat layer side of the laminated film was cut with a cutter knife at an angle of 30 degrees and at a cutting rate of 5 cm/s to form 5 cut lines 5 cm in length on the laminated film. The test was performed at a temperature of 23° C.±2° C. and at a humidity of 50%±5%. After the cut lines were formed, the number of cracks 1 mm or more in length was counted around the cut lines. Tables 2 to 4 list the number of cracks.

<Pencil Hardness>

The pencil hardness was measured according to JIS K5600-5-4. The pencil hardness was measured in the untreated acrylic resin film (base) and in the laminated film including the hard coat layer on one side (formation of HC layer).

<Reflectance>

The reflectance was measured with F20 (Filmetrics, Inc.) in an acrylic resin film specimen in which a black paint was applied to the back side of the surface to be measured. The reflectance was measured in the untreated acrylic resin film (base) and in the laminated film including the hard coat layer on one side (formation of HC layer).

<120° C. Crack Elongation>

The 120° C. crack elongation was measured in the laminated film including the hard coat layer on one side (formation of HC layer). More specifically, the measurement was performed with a Tensilon tensile tester with a 120° C. high-temperature chamber at a remaining heat time of 2 minutes, at a grip distance of 50 mm, and at a crosshead speed of 200 mm/min. The elongation at the point when a crack occurred in the hard coat layer was measured as the 120° C. crack elongation. Tables 2 to 4 list the average of the test results of three specimens.

<Flex Whitening>

The acrylic resin film was bent at a bending rate of 90 degrees/second in a 180-degree bending test. Flex whitening was evaluated by visual inspection for whitening in the bent portion. The bending test was performed at a temperature of 23° C.±2° C. and at a humidity of 50%±5%. Rating was performed according to the following criteria. A: The bent portion had no whitening and remained transparent. B: The bent portion had slight whitening but remained transparent. C: The bent portion had significant whitening.

TABLE 2

| | | Example | | | | | | | | | |
|---|---|---|---|---|---|---|---|---|---|---|---|
| | | 1 | 2 | 3 | 4 | 5 | 6 | 7 | 8 | 9 | 10 |
| Graft copolymer particle (A) | Type (Production Example)/ Amount used (Parts by mass) | 1/ 40 | 1/ 30 | 2/ 30 | 3/ 30 | 4/ 30 | 5/ 30 | 6/ 30 | 1/ 35 | 1/ 30 | 1/ 16.7 |
| | Cross-linked elastomer (A1) in base film (Parts by mass) | 12 | 9 | 9 | 9 | 9 | 9 | 9 | 10.5 | 9 | 5 |
| | BA ratio in graft polymer layer (A2) (% by mass) | 1 | 1 | 1 | 3 | 4 | 6 | 8 | 1 | 1 | 1 |
| Graft copolymer particle (B) | Type (Production Example)/ Amount used (Parts by mass) | 10/ 3.9 | 10/ 3.9 | 10/ 3.9 | 10/ 3.9 | 10/ 3.9 | 10/ 3.9 | 10/ 3.9 | 10/ 1.9 | 11/ 3.9 | 10/ 9.1 |
| | Cross-linked elastomer (B1) in base film (Parts by mass) | 3 | 3 | 3 | 3 | 3 | 3 | 3 | 1.5 | 3 | 7 |
| Total amount of cross-linked elastomer in base film (Parts by mass) | | 15 | 12 | 12 | 12 | 12 | 12 | 12 | 12 | 12 | 12 |
| Haze | Base | 0.6 | 0.6 | 0.5 | 0.6 | 0.6 | 0.6 | 0.6 | 0.6 | 0.6 | 1.1 |
| | After application of solvent | 0.6 | 0.6 | 0.6 | 0.5 | 0.6 | 0.6 | 0.6 | 0.5 | 0.5 | 1.8 |
| | Formation of HC layer | 0.3 | 0.3 | 0.3 | 0.3 | 0.3 | 0.3 | 0.3 | 0.3 | 0.3 | 0.7 |
| Elongation at break (%) | Base | 68 | 66 | 68 | 66 | 64 | 67 | 67 | 53 | 61 | 79 |
| | After application of solvent | 60 | 61 | 59 | 60 | 61 | 59 | 52 | 46 | 60 | 70 |
| | Formation of HC layer | 54 | 50 | 54 | 53 | 54 | 51 | 46 | 44 | 52 | 55 |
| | Decrease | 14 | 16 | 14 | 13 | 10 | 16 | 21 | 9 | 9 | 24 |
| Functional cracking | | A | A | A | A | A | A | A | A | A | A |
| Cutter evaluation | | 12 | 13 | 11 | 14 | 19 | 25 | 34 | 28 | 12 | 2 |
| Pencil hardness | Base | B | HB | HB | HB | HB | HB | HB | HB | HB | HB |
| | Formation of HC layer | H | 2H | 2H | 2H | 2H | 2H | 2H | 2H | 2H | 2H |
| Reflectance (%) | Base | 4.3 | 4.4 | 4.4 | 4.1 | 4.3 | 4.4 | 4.4 | 4.2 | 4.4 | 4.2 |
| | Formation of HC layer | 1.2 | 1.3 | 1.3 | 1.1 | 1.2 | 1.4 | 1.4 | 1.1 | 1.2 | 1.3 |
| 120° C. crack elongation | Base | >200 | >200 | >200 | >200 | >200 | >200 | >200 | >200 | >200 | >200 |
| | Formation of HC layer | 30 | 30 | 30 | 30 | 30 | 30 | 30 | 30 | 30 | 30 |
| Flex whitening | | B | B | B | B | B | B | B | B | B | B |

TABLE 3

| | | Comparative Example | | | | | | | |
|---|---|---|---|---|---|---|---|---|---|
| | | 1 | 2 | 3 | 4 | 5 | 6 | 7 | 8 |
| Graft copolymer particle (A) | Type (Production Example)/ Amount used (Parts by mass) | 1/ 40 | 2/ 40 | 3/ 40 | 4/ 40 | 5/ 40 | 7/ 40 | 8/ 40 | 1/ 45 |
| | Cross-linked elastomer (A1) in base film (Parts by mass) | 12 | 12 | 12 | 12 | 12 | 12 | 12 | 13.5 |

TABLE 3-continued

| | | Comparative Example | | | | | | | |
|---|---|---|---|---|---|---|---|---|---|
| | | 1 | 2 | 3 | 4 | 5 | 6 | 7 | 8 |
| | BA ratio in graft polymer layer (A2) (% by mass) | 1 | 1 | 3 | 4 | 6 | 15 | 20 | 1 |
| Graft copolymer particle (B) | Type (Production Example)/ Amount used (Parts by mass) | — | — | — | — | — | — | — | 10/ 3.9 |
| | Cross-linked elastomer (B1) in base film (Parts by mass) | — | — | — | — | — | — | — | 3 |
| Total amount of cross-linked elastomer in base film (Parts by mass) | | 12 | 12 | 12 | 12 | 12 | 12 | 12 | 16.5 |
| Haze | Base | 0.6 | 0.6 | 0.6 | 0.6 | 0.6 | 0.5 | 0.8 | 0.6 |
| | After application of solvent | 0.5 | 0.6 | 0.7 | 0.6 | 0.5 | 1.2 | 1.6 | 0.7 |
| | Formation of HC layer | 0.4 | 0.3 | 0.3 | 0.3 | 0.3 | 0.5 | 0.8 | 0.3 |
| Elongation at break (%) | Base | 35 | 31 | 34 | 40 | 43 | 51 | 55 | 75 |
| | After application of solvent | 30 | 34 | 30 | 36 | 40 | 48 | 49 | 70 |
| | Formation of HC layer | 30 | 28 | 31 | 35 | 38 | 30 | 31 | 54 |
| | Decrease | 5 | 3 | 3 | 5 | 5 | 21 | 24 | 21 |
| Functional cracking | | B | B | B | B | B | B | B | A |
| Cutter evaluation | | 58 | 52 | 50 | 46 | 43 | 39 | 39 | 8 |
| Pencil hardness | Base | HB | HB | HB | HB | HB | HB | B | 2B |
| | Formation of HC layer | 2H | 2H | 2H | 2H | 2H | 2H | H | HB |
| Reflectance (%) | Base | 4.2 | 4.3 | 4.4 | 4.2 | 4.3 | 4.5 | 4.5 | 4.2 |
| | Formation of HC layer | 1.2 | 1.2 | 1.3 | 1.2 | 1.4 | 1.2 | 1.3 | 1.3 |
| 120° C. crack elongation | Base | >200 | >200 | >200 | >200 | >200 | >200 | >200 | >200 |
| | Formation of HC layer | 30 | 30 | 30 | 30 | 30 | 30 | 30 | 30 |
| Flex whitening | | A | A | A | A | A | A | B | B |

TABLE 4

| | | Comparative Example | | | | | | | |
|---|---|---|---|---|---|---|---|---|---|
| | | 9 | 10 | 11 | 12 | 13 | 14 | 15 | 16 |
| Graft copolymer particle (A) | Type (Production Example)/ Amount used (Parts by mass) | 1/ 20 | 1/ 6.7 | 1/ 36.7 | 1/ 10 | — | 9/ 34.5 | 9/ 28.5 | 9/ 21.2 |
| | Cross-linked elastomer (A1) in base film (Parts by mass) | 6 | 2 | 11 | 3 | — | 10.4 | 8.6 | 6.4 |
| | BA ratio in graft polymer layer (A2) (% by mass) | 1 | 1 | 1 | 1 | — | 10 | 10 | 10 |
| Graft copolymer particle (B) | Type (Production Example)/ Amount used (Parts by mass) | 10/ 3.9 | 10/ 3.9 | 10/ 1.3 | 10/ 11.7 | 10/ 15.6 | 12/ 2.6 | 12/ 1.59 | 12/ 3.17 |
| | Cross-linked elastomer (B1) in base film (Parts by mass) | 3 | 3 | 1 | 9 | 12 | 2.3 | 1.4 | 2.9 |
| Total amount of cross-linked elastomer in base film (Parts by mass) | | 9 | 5 | 12 | 12 | 12 | 12.7 | 10 | 9.3 |
| Haze | Base | 0.6 | 0.6 | 0.6 | 1.5 | 1.9 | 0.5 | 0.6 | 0.7 |
| | After application of solvent | 0.7 | 0.5 | 0.7 | 2.4 | 2.9 | 0.7 | 0.7 | 0.7 |
| | Formation of HC layer | 0.3 | 0.3 | 0.3 | 0.9 | 1.2 | 0.3 | 0.3 | 0.3 |

TABLE 4-continued

| | | Comparative Example | | | | | | | |
|---|---|---|---|---|---|---|---|---|---|
| | | 9 | 10 | 11 | 12 | 13 | 14 | 15 | 16 |
| Elongation at break (%) | Base | 38 | 14 | 45 | 80 | 84 | 58 | 24 | 25 |
| | After application of solvent | 34 | 14 | 45 | 70 | 65 | 45 | 23 | 21 |
| | Formation of HC layer | 30 | 12 | 42 | 45 | 38 | 31 | 11 | 10 |
| | Decrease | 8 | 2 | 3 | 35 | 46 | 27 | 13 | 15 |
| Functional cracking | | B | B | A | A | A | B | B | B |
| Cutter evaluation | | 28 | 41 | 38 | 8 | 9 | 38 | 48 | 43 |
| Pencil hardness | Base | HB | F | HB | HB | B | HB | HB | HB |
| | Formation of HC layer | 2H | 2H | 2H | 2H | H | 2H | 2H | 2H |
| Reflectance (%) | Base | 4.2 | 4.2 | 4.3 | 4.1 | 4.2 | 4.1 | 4.2 | 4.3 |
| | Formation of HC layer | 1.2 | 1.4 | 1.3 | 1.3 | 1.3 | 1.3 | 1.4 | 1.2 |
| 120° C. crack elongation | Base | >200 | >200 | >200 | >200 | >200 | >200 | >200 | >200 |
| | Formation of HC layer | 30 | 30 | 30 | 30 | 30 | 30 | 30 | 30 |
| Flex whitening | | B | B | B | C | C | B | B | B |

The examples show that an acrylic resin film containing graft copolymer particles (A) with an average particle size in the range of 20 to 150 nm and graft copolymer particles (B) with a larger average particle size than the graft copolymer particles (A) has less functional cracking, good cutter evaluation, high pencil hardness, and less flex whitening when satisfying the following conditions:

in the graft copolymer particles (A), a constituent unit derived from an acrylate with an alkyl ester moiety having two or more carbon atoms constitutes 8% or less by mass of the graft polymer layer (A2), and the total amount of the cross-linked elastomer (A1) and the cross-linked elastomer (B1) in the acrylic resin film is 15 parts or less by mass per 100 parts by mass of the acrylic resin film, and the amount of the cross-linked elastomer (B1) is 7 parts or less by mass per 100 parts by mass of the acrylic resin film.

The comparative examples show that an acrylic resin film with less functional cracking, good cutter evaluation, high pencil hardness, and less flex whitening is difficult to form when the acrylic resin film contains no graft copolymer particles (A) or no graft copolymer particles (B) or when the following conditions are not satisfied:

in the graft copolymer particles (A), a constituent unit derived from an acrylate with an alkyl ester moiety having two or more carbon atoms constitutes 8% or less by mass of the graft polymer layer (A2), and the total amount of the cross-linked elastomer (A1) and the cross-linked elastomer (B1) in the acrylic resin film is 15 parts or less by mass per 100 parts by mass of the acrylic resin film, and the amount of the cross-linked elastomer (B1) is 7 parts or less by mass per 100 parts by mass of the acrylic resin film.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An acrylic resin film comprising graft copolymer particles (A) with a multilayer structure and graft copolymer particles (B) with a multilayer structure, wherein:

the graft copolymer particles (A) have an average particle size in a range of 50 to 100 nm, the graft copolymer particles (B) have a larger average particle size than the graft copolymer particles (A), the graft copolymer particles (A) include:
  a cross-linked elastomer (A1) in an amount of 20 to 40 parts by mass compared to 100 parts by mass (A), comprising:
    one or more acrylate constituting 80% or more by mass of (A1) selected from the group consisting of ethyl acrylate, propyl acrylate, butyl acrylate, isobutyl acrylate, and 2-ethyl-hexyl acrylate,
    one or more other vinyl monomer copolymerizable with the acrylate of (A1) constituting 1% to 19.9% by mass of (A1) selected from a methacrylate, and
    one or more polyfunctional monomer constituting 0.1% to 10% by mass of (A1) selected from the group consisting of allyl methacrylate, allyl acrylate, diallyl phthalate, divinyl adipate, divinyl benzene, ethylene glycol dimethacrylate, and propylene glycol dimethacrylate; and
  a graft polymer layer (A2) in an amount of 60 to 80 parts by mass compared to 100 parts by mass (A), comprising:
    an alkyl methacrylate constituting 80% to 99% by mass of the graft polymer layer (A2), and
    a constituent unit derived from an acrylate with an alkyl ester moiety having two or more carbon atoms constitutes 1% to 8% mass of the graft polymer layer (A2);

the graft polymer layer (A2) being closer to a surface layer than the cross-linked elastomer (A1), the graft copolymer particles (B) contain:
  a core comprising one or more cross-linked elastomer (B1),
  wherein the core comprises methyl methacrylate, butyl acrylate, allyl methacrylate, and styrene,
  wherein the core comprises a two-layer, or a three-layer structure, and the core comprises a hard polymer layer,
  an amount of constituent units derived from the methyl methacrylate and the styrene is 40.7% to 49.9% by mass of (B1), and
  an amount of a constituent unit derived from the allyl methacrylate is 0.1% to 10% by mass of (B1), conditions 1) and 2) that follow are satisfied:
1) a total amount of the cross-linked elastomer (A1) and the cross-linked elastomer (B1) in the acrylic resin film is 12 to 15 parts by mass per 100 parts by mass of the acrylic resin film, and
2) an amount of the cross-linked elastomer (B1) is 1.5 parts or more and 7 parts or less by mass per 100 parts by mass of the acrylic resin film,
a thickness of the acrylic resin film is in a range of 40 to 300 µm, and
when tested according to a cutter evaluation, the acrylic resin film has from 2 to 34 cracks that are 1 mm or more in length.

2. The acrylic resin film according to claim 1, wherein the amount of the cross-linked elastomer (B1) is 1.5 parts or more and 4 parts or less by mass per 100 parts by mass of the acrylic resin film.

3. The acrylic resin film according to claim 1, wherein the graft copolymer particles (B) have an average particle size in a range of 150 to 400 nm.

4. The acrylic resin film according to claim 1, wherein the graft copolymer particles (A) constitute 1% to 40% by mass of the acrylic resin film, and the graft copolymer particles (B) constitute 5% or less by mass of the acrylic resin film.

5. The acrylic resin film according to claim 1, wherein the graft polymer layer (A2) is consisting of a polymer of a monomer mixture comprising the alkyl methacrylate, the constituent unit derived from an acrylate with an alkyl ester moiety having two or more carbon atoms, and at least one selected from the group consisting of an aromatic vinyl compound, an unsaturated nitrile, a (meth)acrylic acid or a derivative thereof, an N-substituted maleimide, a maleic anhydride, and a (meth)acryl amide.

6. The acrylic resin film according to claim 1, wherein the graft polymer layer (A2) contains a constituent unit derived from a reactive ultraviolet absorber.

7. The acrylic resin film according to claim 1, wherein the graft copolymer particles (B) include a graft polymer layer (B2), the graft polymer layer (B2) being closer to a surface layer than the cross-linked elastomer (B1) and
the graft polymer layer (B2) is consisting of a polymer of a monomer mixture consisting of at least one selected from the group consisting of an acrylate with an alkyl ester moiety having two or more carbon atoms, an alkyl methacrylate, an aromatic vinyl compound, a (meth)acrylic acid or a derivative thereof, an N-substituted maleimide, a maleic anhydride and a (meth)acryl amide.

8. The acrylic resin film according to claim 1, wherein the acrylic resin film is used as a target to which a liquid containing an organic solvent is to be applied.

9. The acrylic resin film according to claim 8, wherein the liquid is a coating liquid that forms a hard coat layer.

10. A laminated film comprising the acrylic resin film according to claim 1 and at least one functional layer.

11. The laminated film according to claim 10, wherein the at least one functional layer is in direct contact with at least one surface of the acrylic resin film.

12. The laminated film according to claim 10, comprising at least one hard coat layer as the at least one functional layer.

13. The laminated film according to claim 12, having an elongation at break of 46% or more.

14. The laminated film according to claim 12, further comprising a low-refractive-index layer on the at least one hard coat layer.

15. The laminated film according to claim 14, comprising a high-refractive-index layer between the at least one hard coat layer and the low-refractive-index layer.

16. The laminated film according to claim 10, wherein at least one layer of the at least one functional layer is formed of a cured product of a composition containing a siloxane resin with a group including an epoxy group.

17. A molded article comprising the acrylic resin film according to claim 1 and/or a laminated film comprising the acrylic resin film according to claim 1 and at least one functional layer.

18. The molded article according to claim 17, wherein at least part of a surface of a member formed of a thermoplastic resin is covered with the acrylic resin film and/or the laminated film.

19. An in-vehicle display front panel comprising the molded article according to claim 17.

20. The acrylic resin film according to claim 1, wherein the graft copolymer particles (A) comprise the cross-linked elastomer (A1) comprising the butyl acrylate as the acrylate, the methacrylate as the other vinyl monomer copolymerizable with the acrylate of (A1), and the allyl methacrylate as the polyfunctional monomer.

21. The acrylic resin film according to claim 1, wherein the graft copolymer particles (A) comprise the graft polymer layer (A2), comprising methyl methacrylate as the alkyl methacrylate, and butyl acrylate as the constituent unit derived from an acrylate with an alkyl ester moiety having two or more carbon atoms.

22. A method to produce a laminated film, comprising: applying a coating liquid containing an organic solvent that forms a functional layer to at least one surface of the acrylic resin film according to claim 1 to form a coating film; and
drying or drying and curing the coating film to form the functional layer.

* * * * *